US009633340B2

(12) United States Patent
Merg

(10) Patent No.: US 9,633,340 B2
(45) Date of Patent: Apr. 25, 2017

(54) METHODS AND SYSTEMS FOR MAPPING REPAIR ORDERS WITHIN A DATABASE

(71) Applicant: Snap-on Incorporated, Kenosha, WI (US)

(72) Inventor: Patrick S. Merg, Hollister, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/880,228

(22) Filed: Oct. 10, 2015

(65) Prior Publication Data

US 2016/0034857 A1    Feb. 4, 2016

Related U.S. Application Data

(63) Continuation of application No. 13/746,165, filed on Jan. 21, 2013, now Pat. No. 9,158,834.

(51) Int. Cl.
  *G06F 17/30* (2006.01)
  *G06Q 10/00* (2012.01)
  (Continued)

(52) U.S. Cl.
  CPC ........... *G06Q 10/20* (2013.01); *G06F 3/0482* (2013.01); *G06F 3/04842* (2013.01); *G06F 17/30619* (2013.01)

(58) Field of Classification Search
  CPC ............. G06F 17/30619; G06F 3/0482; G06F 3/04842; G06Q 10/20
  (Continued)

(56) References Cited

U.S. PATENT DOCUMENTS

| 4,404,639 A | * | 9/1983 | McGuire | ............... G01R 31/007 |
| | | | | 701/114 |
| 4,796,206 A | * | 1/1989 | Boscove | ............... F02D 41/266 |
| | | | | 701/99 |

(Continued)

FOREIGN PATENT DOCUMENTS

| WO | 2004092918 A2 | 10/2004 |
| WO | 2013063232 A1 | 5/2013 |
| WO | 2014001799 A1 | 1/2014 |

OTHER PUBLICATIONS

Ben-Bassat, Moshe, et al., "Workflow Management Combined with Diagnostic and Repair Expert System Tools for Maintenance Operations", AUTOTESTCON '93, San Antonio, TX, Sep. 20-23, 1993, pp. 367-375.*

(Continued)

*Primary Examiner* — Robert Stevens
(74) *Attorney, Agent, or Firm* — McDonnell Boehnen Hulbert & Berghoff LLP

(57) ABSTRACT

Methods and systems for mapping repairs orders within a database are described. Mapping a repair order can include generating a searchable data record with multiple data record fields. Each data record field can include a term located on the repair order or a standard term associated with the term on the repair order. In order to retrieve repair orders from the database, the data records can be searched using search criteria that match standard terms storable in the data record fields. Although the repair orders can be searched to find repair orders with terms that match the search criteria, the search may be carried our more efficiently (e.g., quicker) by searching the data records instead of the repair orders. One or more repairs orders can be associated with real-fix tips. Phrases of the real-fix tips can be selected automatically based, for example, or RO terms recited on the repair orders.

16 Claims, 23 Drawing Sheets

(51) Int. Cl.
*G06F 3/0482* (2013.01)
*G06F 3/0484* (2013.01)

(58) Field of Classification Search
USPC .................................................... 707/802
See application file for complete search history.

(56) References Cited

U.S. PATENT DOCUMENTS

| | | | | |
|---|---|---|---|---|
| 4,899,292 | A * | 2/1990 | Montagna | G06F 17/30017 |
| 5,058,044 | A | 10/1991 | Stewart et al. | |
| 5,146,404 | A * | 9/1992 | Calloway | G06Q 10/0875 |
| | | | | 705/1.1 |
| 5,317,503 | A * | 5/1994 | Inoue | G06Q 10/0875 |
| | | | | 700/90 |
| 5,432,904 | A * | 7/1995 | Wong | G06Q 40/08 |
| | | | | 701/29.3 |
| 5,504,674 | A * | 4/1996 | Chen | G06Q 50/00 |
| | | | | 345/667 |
| 5,533,093 | A * | 7/1996 | Horton | H04M 1/24 |
| | | | | 379/21 |
| 5,541,840 | A * | 7/1996 | Gurne | B60T 8/885 |
| | | | | 701/29.3 |
| 5,778,381 | A | 7/1998 | Sandifer | |
| 5,913,215 | A | 6/1999 | Rubinstein et al. | |
| 5,950,169 | A | 9/1999 | Borghesi et al. | |
| 6,141,608 | A * | 10/2000 | Rother | G01M 17/007 |
| | | | | 701/29.1 |
| 6,263,322 | B1 * | 7/2001 | Kirkevold | G06Q 30/0283 |
| | | | | 705/400 |
| 6,285,932 | B1 * | 9/2001 | de Bellefeuille | G07C 5/008 |
| | | | | 701/2 |
| 6,308,120 | B1 * | 10/2001 | Good | G08G 1/20 |
| | | | | 340/438 |
| 6,311,162 | B1 * | 10/2001 | Reichwein | G06Q 10/06 |
| | | | | 705/1.1 |
| 6,314,422 | B1 * | 11/2001 | Barker | G06F 17/30887 |
| | | | | 340/539.1 |
| 6,381,587 | B1 | 4/2002 | Guzelsu | |
| 6,487,479 | B1 | 11/2002 | Nelson | |
| 6,556,971 | B1 * | 4/2003 | Rigsby | G06F 3/0481 |
| | | | | 33/286 |
| 6,587,768 | B2 * | 7/2003 | Chene | G07C 5/006 |
| | | | | 701/33.2 |
| 6,609,050 | B2 * | 8/2003 | Li | G06Q 30/02 |
| | | | | 701/29.1 |
| 6,714,846 | B2 * | 3/2004 | Trsar | G07C 5/0808 |
| | | | | 701/29.1 |
| 6,768,935 | B1 | 7/2004 | Morgan et al. | |
| 6,785,582 | B2 | 8/2004 | Araujo | |
| 6,804,589 | B2 | 10/2004 | Foxford et al. | |
| 6,845,307 | B2 | 1/2005 | Rother | |
| 6,885,903 | B2 * | 4/2005 | Olle | G06Q 10/087 |
| | | | | 700/105 |
| 6,898,605 | B2 * | 5/2005 | Constantino | G06F 17/2735 |
| | | | | 707/693 |
| 6,925,368 | B2 * | 8/2005 | Funkhouser | G07C 5/0808 |
| | | | | 340/438 |
| 6,941,514 | B2 | 9/2005 | Bradford | |
| 7,092,937 | B2 | 8/2006 | Morgan et al. | |
| 7,171,372 | B2 | 1/2007 | Daniel et al. | |
| 7,209,817 | B2 | 4/2007 | Abdel-Malek et al. | |
| 7,373,225 | B1 | 5/2008 | Grier et al. | |
| 7,373,226 | B1 | 5/2008 | Cancilla et al. | |
| 7,444,216 | B2 | 10/2008 | Rogers et al. | |
| 7,551,993 | B1 | 6/2009 | Cancilla et al. | |
| 7,613,627 | B2 | 11/2009 | Doyle et al. | |
| 7,739,007 | B2 * | 6/2010 | Logsdon | G07C 5/0808 |
| | | | | 701/31.5 |
| 8,290,833 | B2 | 10/2012 | Yang et al. | |
| 8,600,610 | B2 | 12/2013 | Bertosa et al. | |
| 9,158,834 | B2 | 10/2015 | Merg | |
| 2002/0007237 | A1 * | 1/2002 | Phung | G05B 23/0216 |
| | | | | 701/31.4 |
| 2002/0007289 | A1 * | 1/2002 | Malin | G06Q 10/06 |
| | | | | 705/4 |
| 2002/0016655 | A1 * | 2/2002 | Joao | G07C 5/008 |
| | | | | 701/33.4 |
| 2002/0073012 | A1 * | 6/2002 | Lowell | G06Q 30/0601 |
| | | | | 705/37 |
| 2002/0128874 | A1 | 9/2002 | McIntosh et al. | |
| 2002/0138185 | A1 | 9/2002 | Trsar et al. | |
| 2003/0004624 | A1 | 1/2003 | Wilson et al. | |
| 2003/0050830 | A1 | 3/2003 | Troyer | |
| 2003/0130966 | A1 | 7/2003 | Thompson et al. | |
| 2003/0195681 | A1 | 10/2003 | Rother | |
| 2004/0176885 | A1 | 9/2004 | Quinn | |
| 2004/0199542 | A1 | 10/2004 | Morgan et al. | |
| 2005/0027694 | A1 | 2/2005 | Sauermann | |
| 2005/0065678 | A1 * | 3/2005 | Smith | G07C 5/008 |
| | | | | 701/31.4 |
| 2005/0085964 | A1 | 4/2005 | Knapp et al. | |
| 2005/0154749 | A1 | 7/2005 | Snow et al. | |
| 2005/0171661 | A1 * | 8/2005 | Abdel-Malek | B61L 27/0094 |
| | | | | 701/31.4 |
| 2005/0187834 | A1 | 8/2005 | Painter et al. | |
| 2006/0095230 | A1 | 5/2006 | Grier et al. | |
| 2006/0101074 | A1 * | 5/2006 | Cancilla | G07C 5/0808 |
| 2006/0106797 | A1 | 5/2006 | Srinivasa et al. | |
| 2006/0142907 | A1 | 6/2006 | Cancilla et al. | |
| 2006/0161313 | A1 | 7/2006 | Rogers et al. | |
| 2007/0043487 | A1 | 2/2007 | Krzystofczyk et al. | |
| 2007/0293997 | A1 | 12/2007 | Couch | |
| 2008/0004764 | A1 | 1/2008 | Chinnadurai et al. | |
| 2008/0183351 | A1 | 7/2008 | Grier et al. | |
| 2008/0208609 | A1 | 8/2008 | Preece et al. | |
| 2009/0006476 | A1 | 1/2009 | Andreasen et al. | |
| 2009/0062977 | A1 | 3/2009 | Brighenti | |
| 2009/0169092 | A1 | 7/2009 | McCleary et al. | |
| 2009/0295559 | A1 | 12/2009 | Howell et al. | |
| 2009/0307027 | A1 | 12/2009 | Charbeneau et al. | |
| 2010/0005010 | A1 | 1/2010 | Chenn | |
| 2010/0023203 | A1 * | 1/2010 | Shibi | G07C 5/0808 |
| | | | | 701/31.4 |
| 2010/0057290 | A1 | 3/2010 | Brillhart et al. | |
| 2010/0063668 | A1 | 3/2010 | Zhang et al. | |
| 2010/0138242 | A1 | 6/2010 | Ferrick et al. | |
| 2011/0010656 | A1 | 1/2011 | Mokotov | |
| 2011/0118905 | A1 | 5/2011 | Mylaraswamy et al. | |
| 2011/0172874 | A1 | 7/2011 | Patnaik et al. | |
| 2011/0238258 | A1 | 9/2011 | Singh et al. | |
| 2011/0289055 | A1 | 11/2011 | Pothering et al. | |
| 2012/0044086 | A1 * | 2/2012 | Ruther | G07C 5/0816 |
| | | | | 340/870.02 |
| 2012/0245791 | A1 | 9/2012 | Yun et al. | |
| 2012/0303205 | A1 | 11/2012 | Subramania et al. | |
| 2013/0124032 | A1 | 5/2013 | Singh et al. | |
| 2013/0304306 | A1 | 11/2013 | Selkirk et al. | |
| 2013/0325541 | A1 | 12/2013 | Capriotti et al. | |
| 2014/0032422 | A1 * | 1/2014 | Jones | G06Q 10/06 |
| | | | | 705/304 |
| 2014/0207515 | A1 | 7/2014 | Merg et al. | |
| 2014/0279169 | A1 | 9/2014 | Leos | |

OTHER PUBLICATIONS

Landers, Todd, et al., "A Digital Maintenance Information (DMI) System for ATE", AUTEST 1989, Philadelphia, PA, Sep. 1989, pp. 272-276.*

Zhang, Yilu, et al., "Remote Vehicle State of Health Monitoring and Its Application to Vehicle No-Start Prediction", AUTEST 2009, Anaheim, CA, Sep. 14-17, 2009, pp. 88-93.*

Muller, Tobias Carsten; et al.; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

(56) References Cited

OTHER PUBLICATIONS

Snap-On Incorporated, Ask-aTech FAQ, downloaded from the world wide web at http://web.archive.org/web/20110920223204/http://www.askatech.com/AskATechLive/faq.aspx as archived on Sep. 20, 2011, 10 pages.
Snap-On Incorporated, ShopKey PRO, Now even smarter, to your shop look even smarter, Apr. 13, 2012, 4 pages.
International Searching Authority at the United States Patent and Trademark Office, International Search Report regarding International Application No. PCT/US14/12273, 4 pages, mailing date Oct. 15, 2014.
International Searching Authority At the United States Patent and Trademark Office, Written Opinion regarding International Application No. PCT/US14/12273, 7 pages, mailing date Oct. 15, 2014.
International Searching Authority at the United States Patent and Trademark Office, PCT Recordation of Search History regarding International Application No. PCT/US14/12273, 7 pages, completion date Aug. 6, 2014.

Ben-Bassat, Moshe; et al., "Workflow Management Combined with Diagnostic and Repair Expert System Tools for Maintenance Operations," AUTOTESTCON '93, San Antonio, TX, Sep. 20-23, 1993, pp. 367-375.
The Stanford Natural Language Processing Group, the Stanford natural language processing group, downloaded from the World Wide Web at http://nlp.stanford.edu/software/index.shtml on Oct. 17, 2014, 3 pages.
The Stanford Natural Language Processing Group, Stanford CoreNLP, downloaded from the World Wide Web at http://nlp/stanford.edu/software/corenlp.shtml on Oct. 17, 2014, 8 pages.
Consortium on Conginitive Science Instruction; Introduction to natural language processing, downloaded from the World Wide Web at http://www.mind.ilstu.edu/curriculum/protothinker/nuatural_language_processing.php on Oct. 21, 2013, 32 pages.
Dickinson, Marcus; Linguistics 362: Introduction to Natural Language Processing; Jul. 1, 2012; 48 pages.
European Patent Office, Extended European Search Report, EP Appl. No. 14704717.9, dated Jul. 1, 2016, 7 pages.

\* cited by examiner

181 → RTR Car Repair, Tuscaloosa, Alabama    182 → February 18, 2013

183 → Customer: C. N. Saban    VIN: 1GYS3BEFXCR123456

184 → Vehicle: 2012 Cadillac Escalade, 6.2 L, Automatic Trans.
Complaint: Car won't start. Check engine light on.

| Service/Correction | Time | Rate | Cost | | Part Description | Part # | Price |
|---|---|---|---|---|---|---|---|
| Change oil and filter. ← 185 | | | | | Starter switch | 6012980 | $89.99 |
| Check battery condition. (C45)  190 | 0.3 | $100 | $30 | | Oil Filter | 6043011 | $19.99 |
| Check starter/ignition system. (C117) | 0.5 | $100 | $50 | | ECT sensor | 6563772 | $73.99 |
| Switch hard to turn. Replace starter switch. (R458) | 1.0 | $100 | $100 | | Sub-total | | $183.97 |
| Verify repair. (V18) | 0.2 | $100 | $20 | | Labor | | $335.00 |
| Change engine oil and filter. (C085)  191 | 0.5 | $50 | $25 | | Tax | | $51.90 |
| Lubricate chassis. (C086) | 0.2 | $50 | $10 | | Total | | $570.87 |
| Check DTC. Diagnose DTC 117. (C100)  192 | 0.4 | $100 | $40 | | | | |
| Coolant sensor short. R/R coolant sensor. (R199) | 0.4 | $100 | $40 | | | | |
| Verify repair. (V18) | 0.2 | $100 | $20 | | | | |

187 → (Check battery condition row)
188 → (Change engine oil and filter row)
189 → (Check DTC row)
186 → (Parts table)
180 (overall)

FIG. 18

| A | B | C | D | E | F | G |
|---|---|---|---|---|---|---|
| RO ID | LINE NO. | YEAR | MAKE | MODEL | ENGINE | SYSTEM ← 211 |
| 100200 | 1 | 2012 | CADILLAC | ESCALADE | 6.2 L | AUTO ← 213 |
| 100200 | 3 | 2012 | CADILLAC | ESCALADE | 6.2 L | AUTO ← 215 |

| H | I | J | K | L | M | N |
|---|---|---|---|---|---|---|
| CONTEXT | RFT | DTC | COMP. | SRV DATE | LOCATION | LOC ← 211 |
| MECH. | NULL | NULL | IGNITION SWITCH | 2-18-13 | TUSCALOOSA AL | R458 ← 213 |
| ELEC. | NULL | P0117 | COOLANT TEMPERATURE SENSOR | 2-18-13 | TUSCALOOSA AL | R199 ← 215 |

FIG. 20

| A | B | C | D | E | |
|---|---|---|---|---|---|
| RO TERM 1 | RO TERM 2 | RO TERM N | PHRASE | RFT APPLICABILITY | |
| DTC P0101 | MAF SENSOR | NA | % DTC %, REPLACED THE %COMPONENT NAME%. | TITLE | 0 |
| DTC P0101 | MAF SENSOR | NA | P0101, REPLACED THE MAF SENSOR. | TITLE | 1 |
| DTC P0300 | INJECTOR | CUSTOMER REPORTS CHECK ENGINE LIGHT IS ON | CUSTOMER REPORTS CHECK ENGINE LIGHT IS ON AND THE CAR RUNS ROUGH. | COMPLAINT | 2 |
| DTC P0101 | MAF SENSOR | CHECK ENGINE LIGHT ON | CUSTOMER REPORTS CHECK ENGINE LIGHT IS ON. | COMPLAINT | 3 |
| DTC P0101 | MAF SENSOR | NA | % DTC %, %COMPONENT NAME% DEFECTIVE. | CAUSE | 4 |
| DTC P0101 | MAF SENSOR | NA | REPLACED MAF SENSOR. CLEARED CODES AND ROAD TESTED TO CONFIRM CHECK ENGINE LIGHT DID NOT TURN ON. | CORRECTION | 5 |
| DTC P0301 | INJECTOR | NA | P0301, CYLINDER 1 MISFIRE DETECTED. INJECTOR FOR CYLINDER 1 DEFECTIVE. | CAUSE | 6 |
| DTC P0301 DTC P0304 | COIL PACK | NA | P0301, CYLINDER 1 MISFIRE DETECTED, AND P0304, CYLINDER 4 MISFIRE DETECTED. COIL PACK FOR CYLINDERS 1 AND 4 DEFECTIVE. | CAUSE | 7 |

METHODS AND SYSTEMS FOR MAPPING REPAIR ORDERS WITHIN A DATABASE

REFERENCE TO RELATED APPLICATION

This application is a continuation application of U.S. patent application Ser. No. 13/746,165 filed Jan. 21, 2013. U.S. patent application Ser. No. 13/746,165 is incorporated herein by reference.

BACKGROUND

Many products produced by manufacturers occasionally have to be repaired. As the complexity of products increases, the complexity of the data relied on by repair technicians to repair the products may also increase.

The repair technicians can be located in various locations, such that a first repair technician located at first location is not aware of a repair made by a second repair technician at second location. It may be beneficial, if the second repair technician could obtain information regarding the repair made by the first technician. It may be even more beneficial, if the second repair technician could receive the information, regarding the repair made by the first repair technician, knowing that a third party has confirmed that information regarding the repair is for a repair that successfully fixed a complaint or malfunction of the product worked on by the first repair technician. Searching for repair information desired by a repair technician can be very time consuming.

OVERVIEW

Example embodiments are described herein. In one respect, an example embodiment can take the form of a method comprising (i) storing, within a repair order (RO) database at a computer-readable data storage device, a first RO comprising contents pertaining to servicing a device, (ii) identifying, during a search of the contents of the first RO using a processor, first field data that matches data defined for recording in at least one data field of a data record to map repair orders, (iii) generating, at the computer-readable data storage device, a first data record to map the first repair order for subsequent searching of the RO database, and (iv) storing, within the first data record at the computer-readable data storage device, the first field data identified during the search of the contents of the first RO.

In another respect, an example embodiment can take the form of a system comprising a computer-readable data storage device storing an RO database and within the RO database a first RO comprising contents pertaining to servicing a device, and a data processing machine including a processor configured to execute computer-readable program instructions. The computer-readable program instructions include program instructions executable by the processor to (i) identify, during a search of the contents of the first RO using the processor, first field data that matches data defined for recording in at least one data field of a data record to map repair orders, (ii) generate, at the data storage device, a first data record to map the first RO for subsequent searching of the RO database, and (iii) store, within the first data record, the first field data identified during the search of the contents of the first RO.

In yet another respect, an example embodiment can take the form of a method comprising (i) receiving, at a processor, a first RO term pertaining to a service procedure described on a computer-readable RO, (ii) selecting, using the processor based on the first RO term, a first phrase for including within a real-fix tip pertaining to the service procedure described on the computer-readable RO, (iii) generating, using the processor, the real-fix tip pertaining to the service procedure described on the computer-readable RO, wherein the real-fix tip includes the first phrase selected based on the first RO term, and (iv) transmitting the real-fix tip including the first phrase selected based on the first RO term.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, in which:

FIG. 18 shows an example RO in accordance with one or more example embodiments;

FIG. 20 shows example data record field names and example data records;

FIG. 23 is a table showing example phrase data storable in a data storage device.

DETAILED DESCRIPTION

I. Introduction

Figure 1:
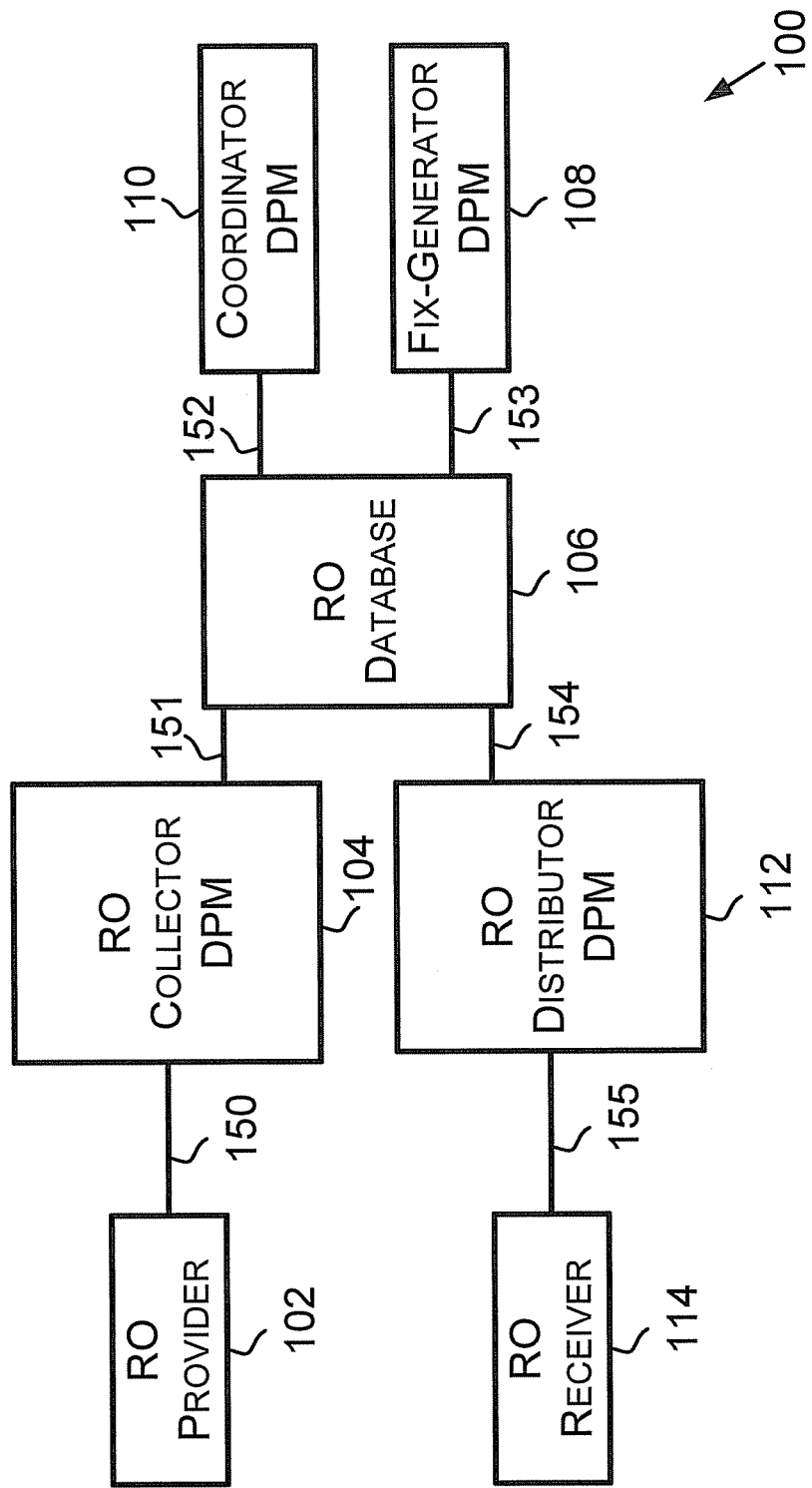
FIG. 1 is a block diagram of an example system in accordance with one or more example embodiments.

This description describes several example embodiments including example embodiments regarding repair orders (RO) and real-fix tips. The contents (that is, RO data) of computer-readable RO can be searched to identify RO data (such as RO terms) that match various terms (such as predefined standard and non-standard terms). A data record, associated with the RO, can be generated to include the various terms identified on the RO or standard terms associated with one or more of the identified terms. An RO for which a data record has not been generated can be referred to as an un-mapped RO. Mapping an un-mapped RO, which can include generating the data record and generating a mapped RO, can provide for more efficient searching of an RO database that stores the RO. The mapped RO can include standard terms not used on the un-mapped RO. The use of standard terms on an RO can lead to less confusion by repair technicians that access RO from the RO database. Even so, the repair technician can also access original RO with non-standard terms.

Real-fix-tips can be generated and associated with one or more RO. A person using data processing machines within the example systems can access RO and generate real-fix-tips for subject matter which that the person is considered to be an expert. After a real-fix-tip is generated for a given RO, other RO that pertain to the real-fix-tip can be classified as a duplicate of the given RO. The RO database can include the real-fix-tips. Repair technicians can access RO and real-fix-tips from the RO database to assist them in diagnosing or repairing a repairable item.

The RO within the RO database can be classified as a published RO that the repair technician can access from the RO database or a non-published RO that repair technician cannot access from the RO database. An original RO provided by an RO provider can be referred to as an unpublished RO. After the unpublished RO is reviewed by a person operating a fix-generator data processing machine (DPM) or a person operating a coordinator DPM, the unpublished RO can be published for access to RO receivers. Upon publication, the unpublished RO becomes a published RO. For any of a variety of reasons, a published RO can be reclassified as an unpublished RO that cannot be accessed by RO receivers and then subsequently re-published.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. The ordinal numbers can be written in the form of $1^{st}$, $2^{nd}$, $3^{rd}$, and so on.

The following abbreviations or acronyms are used in the description:

CRPI—Computer-readable program instructions;
DPM—Data Processing Machine;
DTC—Diagnostic Trouble Code;
e.g.,—for example;
FIG.—Figure;
GPS—Global Positioning System;
GUI—Graphical User Interface;
HVAC—heating, ventilation, and air conditioning;
L—Liter;
LAN—Local Area Network;
LOC—Labor operation code;
NA—non-applicable;
NST—Non-standard Terms;
OCR—Optical Character Recognition;
OCR'd—Optical Character Recognized;
PDF—portable document format;
QC—Quality Control;
RO—Repair Order;
RFT—Real-fix Tip;
SPL—Standard Phrase List;
SQL—Structured Query Language;
ST—Standard Terms;
VIN—Vehicle Identification Number;
XML—Extensible Markup Language;
YMM—Year/Make/Model;
YMME—Year/Make/Model/Engine; and
YMMES—Year/Make/Model/Engine/System.

The example embodiments are applicable to a variety of repairable items, such as a vehicle or some other type of repairable item. For purposes of this description, a vehicle can comprise an automobile, a motorcycle, a semi-tractor, a light-duty truck, a medium-duty truck, a heavy-duty truck a farm machine, a boat or ship, a generator, an airplane, or some other type of vehicle. A vehicle can include or use any appropriate voltage or current source, such as a battery, an alternator, a fuel cell, and the like, providing any appropriate current and/or voltage, such as about 12 volts, about 42 volts, and the like. A vehicle can include or use any desired system or engine. Those systems or engines can comprise items that use fossil fuels, such as gasoline, natural gas, propane, and the like, electricity, such as that generated by a battery, magneto, fuel cell, solar cell and the like, wind and hybrids or combinations thereof. The example embodiments can carry out a variety of functions, including functions for diagnosing a vehicle.

The block diagrams, GUI, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions or by any combination of hardware, firmware, or software.

II. Example Architecture

FIG. 1 is a block diagram of a system 100 in accordance with one or more of the example embodiments disclosed herein. As shown in FIG. 1, system 100 includes an RO provider 102, an RO collector data processing machine (DPM) 104, an RO database 106, a fix-generator DPM 108, a coordinator DPM 110, an RO distributor DPM 112, an RO receiver 114, and network links 150, 151, 152, 153, 154, and 155. One or more of the network links can comprise a portion of a local area network (LAN), a portion of the Internet, or a system bus, such as a control bus, data bus, or address bus within a computing device, such as a DPM or a personal computer. One or more of the network links can be configured to carry data between more than two devices. One or more of the network links can comprise a wireless link or a wired link.

RO provider 102 can generate repair orders and provide repair orders to RO collector DPM 104. A person skilled in the art will understand that RO provider 102 can comprise one or more RO providers. An RO provider can comprise a person. Additionally or alternatively, an RO provider can comprise a machine. Each RO provider can generate one or more types of RO including, but not limited to, RO printed on paper (hereinafter "paper RO") and computer-readable (e.g., electronic) RO. Each RO can include information pertaining to repairing a repairable item, such as a vehicle. Additionally or alternatively, each RO can include other information such as information pertaining to performing preventative maintenance to the repairable item. Prior to providing the RO to RO collector DPM 104, the provided RO can be considered an unpublished RO.

RO database 106 can comprise a data storage device, such as a non-transitory computer-readable data storage device. RO database 106 can store RO that RO collector DPM 104 receives from RO provider 102. RO database 106 can comprise at least one of the following types of RO: an original repair order, a portion of an original repair order, a copy of an original repair order, and a copy of a portion of an original repair order. Each RO in RO database 106 can be for any of a variety of repairable items. One or more repair orders within RO database 106 can include orders other than for repairing a repairable item such as orders for performing preventive maintenance of the repairable item. FIG. 18, described below, shows an example RO in accordance with the example embodiments.

In the embodiments in which RO provider 102 provides paper RO, RO collector DPM 104 can comprise a scanner to generate scanned images of the paper RO and optical character recognition (OCR) computer-readable program instructions (CRPI) to generate searchable text representations of the paper RO. The data obtained from executing the OCR CRPI can be referred to as an optical character recognized (ORC'd) copy of the RO or a computer-readable RO.

Fix-generator DPM 108 can be configured to generate a real-fix-tip (or at least a portion of a real-fix tip) for a group of one or more RO (hereinafter, an "RO group") and to provide the real-fix tip to RO database 106. Providing the real-fix tip or at least a portion of a real-fix tip generated by fix-generator DPM 108 can be provided to a processor that causes the real-fix tip to be stored in RO database 106. In this description, the example embodiments are described as if the RO database comprises a processor to search RO database 106 and to store data within RO database 106. A person skilled in the art, however, will understand that a processor that searches RO database 106 or causes data to be stored within RO database 106 can be within a device distinct from RO database 106. For instance, in accordance with embodiments in which RO collector DPM 104 is distinct from RO database 106, the processor can be a part of RO collector DPM 104. RO database 106 can store real-fix tips and data that associate each real-fix tip with one or more RO stored in RO database 106.

Coordinator DPM 110 can display real-fix tips and RO stored in RO database 106. Coordinator DPM 110 can provide selectors to select whether a real-fix tip and the RO associated with the real-fix tip are published for presentation to RO Receiver 114. Coordinator DPM 110 can provide selectors to select whether to return the real-fix tip to the fix-generator DPM 108 for revising the real-fix tip.

In accordance with one or more example embodiments, system 100 can comprise one or more additional fix-generator DPM 108 configured like fix-generator DPM 108. In accordance with those same embodiments or other embodiments, system 100 can comprise one or more additional coordinator DPM configured like coordinator DPM 110. A person having ordinary skill in the art will understand that a fix-generator DPM and a coordinator DPM can be co-located or integrated such that a single DPM can carry out the functions of both fix-generator DPM 108 and coordinator DPM 110. The person having ordinary skill in the art will also understand that fix-generator DPM 108 or coordinator DPM 110 can be configured as a server or client device. For instance, a server (not shown) in system 100 can serve applications executable by a processor of fix-generator DPM 108 or coordinator DPM 110. In that regard, fix-generator DPM 108 or coordinator DPM 110, acting as a client, can execute those applications to carry out the functions described herein as being performed by fix-generator DPM 108 or coordinator DPM 110, respectively. As an example, RO collector DPM 104 or RO distributor DPM 112 can be configured as the server.

RO distributor DPM 112 can receive, from RO receiver 114, requests for RO and requests for real-fix-tips. RO distributor DPM 112 can transmit RO and real-fix-tips to RO receiver 114. RO receiver 114 can comprise a machine configured to request and receive RO and real-fix-tips from RO distributor DPM 112. RO receiver 114 can present RO and real-fix-tips to a user operating RO receiver 114. RO receiver 114 can comprise a display and audio speaker such that presenting an RO and real-fix-tip can occur visually or audibly. RO receiver 114 and RO provider 102 can be separate machines, co-located or located remote from one another. Alternatively, RO receiver 114 and RO provider 102 can be a single machine.

In accordance with one or more example embodiments, RO distributor DPM 112 can be comprise a data server, such as a data server operated by Snap-On Incorporated, Kenosha, Wis., that serves webpages including Ask-a-Tech data. In accordance with that or those embodiments, RO receiver 114 can comprise a computing device, such as a laptop computer, a desktop computer, a tablet (e.g., an IPad by Apple, Inc.), or a vehicle diagnostic tool having an interface to the internet. RO distributor DPM 112 can maintain user-account data to confirm that a technician using RO receiver 114 has authorization to access RO and real-fix tips stored in RO database 106.

Figure 2:
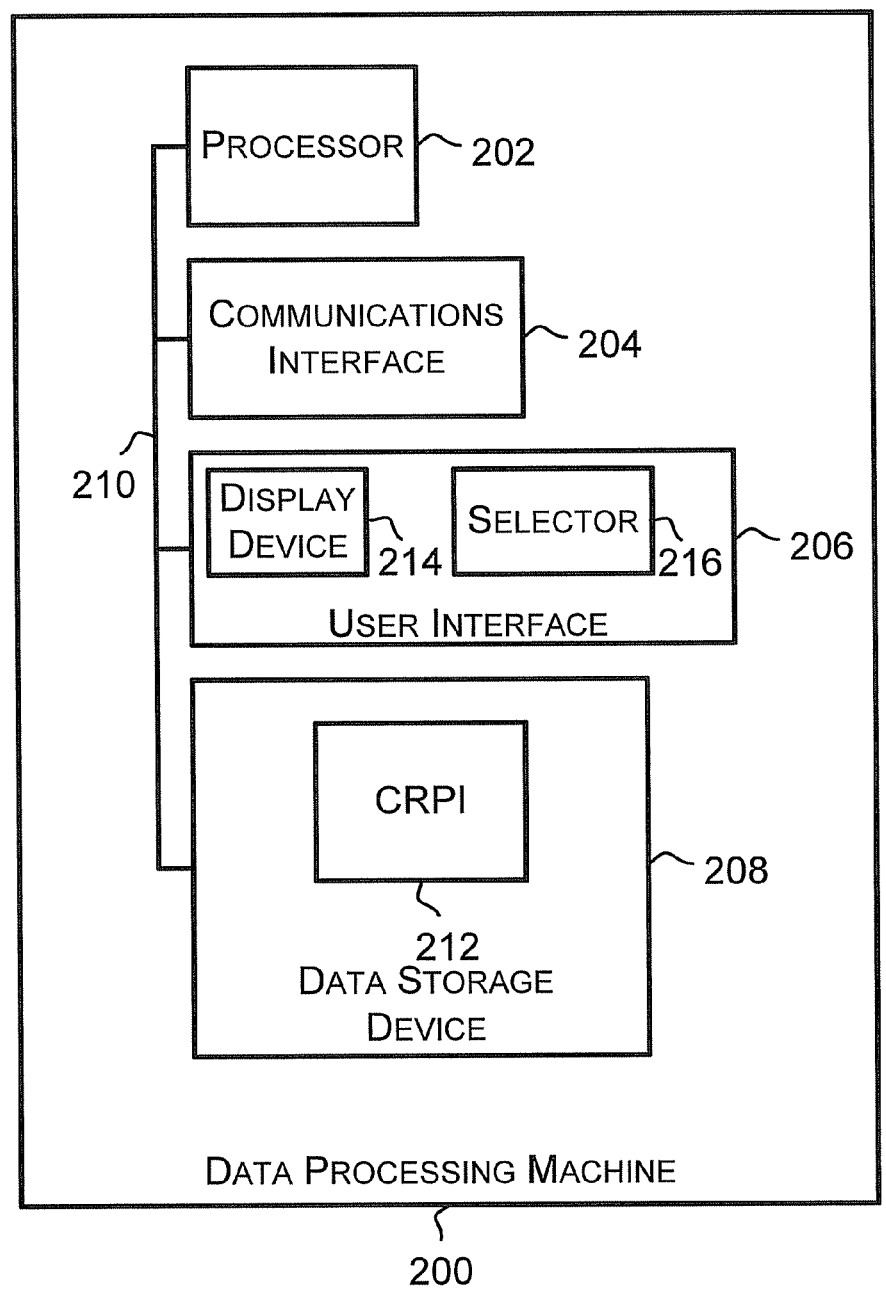
FIG. 2 is a block diagram of a data processing machine in accordance with one or more example embodiments.

Next, FIG. 2 is a block diagram of an example data processing machine (DPM) 200 in accordance with one or more of the example embodiments described herein. As shown in FIG. 2, DPM 200 includes a processor 202, a communications interface 204, a user interface 206, and a data storage device 208, all of which can be linked together via a system bus, network, or other connection mechanism 210. One or more of RO collector DPM 104, fix-generator DPM 108, coordinator DPM 110, and RO distributor DPM 112 can be arranged like DPM 200.

A processor, such as processor 202, can comprise one or more general purpose processors (e.g., INTEL single core microprocessors or INTEL multicore microprocessors) or one or more special purpose processors (e.g., digital signal processors). Processor 202 is operable to execute computer-readable program instructions, such as computer-readable program instructions (CRPI) 212.

Communications interface 204 can comprise one or more interfaces (e.g., an interface to the Internet, an interface to a LAN, or an interface to a system bus within a personal computer). Communications interface 204 can comprise a wireless network interface or a wired network interface. Communications interface 204 can comprise a network interface card, such an Ethernet interface card, or a wireless network card, such as a WiFi network card.

Communications interface 204 can be configured to transmit data across connection mechanism 210, receive data transmitted across connection mechanism 210, transmit data across a network link, and receive data transmitted across a network link. Communications interface 204 can interface to RO collector DPM 104, RO database 106, RO distributor DPM 112, a DPM, or connection mechanism 210. Interfacing to any of those elements or some other element can include transmitting data to that element and receiving data transmitted from that element.

User interface 206 can comprise one or more user interface elements by which a user can input data or cause data to be input into DPM 200. Those elements for inputting data can include, e.g., a selector 216, such as a QWERTY keyboard, a computer mouse, or a touch screen. Additionally or alternatively, the user interface elements for inputting data can include speech recognition circuitry and a microphone.

User interface 206 can also comprise one or more user interface elements by which data can be presented to one or more users. Those elements for presenting data to a user can include, e.g., a display device 214, a GUI, or an audible speaker.

A data storage device, such as data storage device 208, can comprise a non-transitory computer-readable storage medium readable by processor 202. The computer-readable storage medium can comprise volatile and/or non-volatile storage components, such as optical, magnetic, organic or other memory or disc storage, which can be integrated in whole or in part with a processor, such as processor 202. FIG. 2 illustrates that data storage device 208 comprises CRPI 212.

Figure 3:
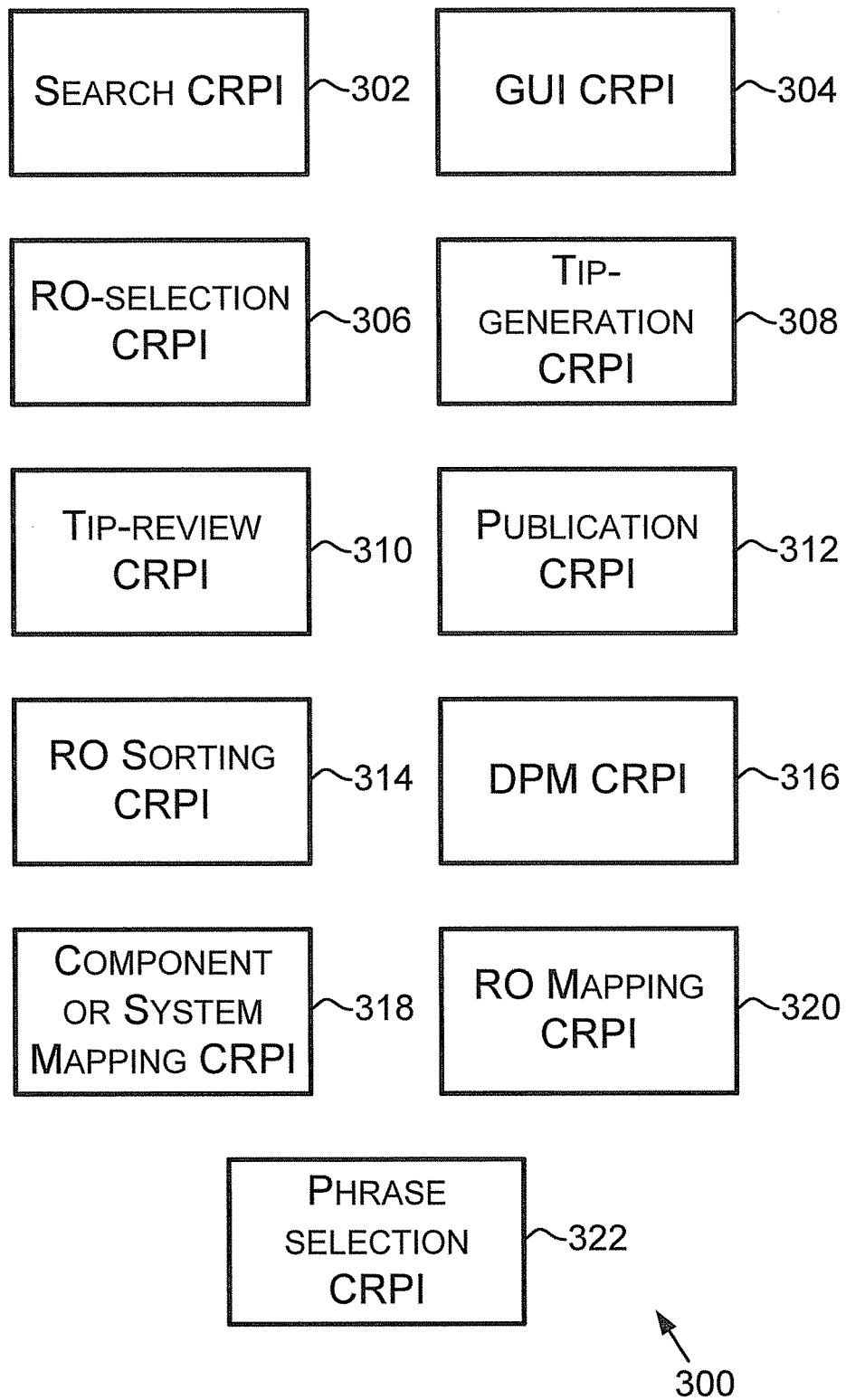
FIG. 3 depicts a suite of computer-readable program instructions in accordance with one or more example embodiments.

Next, FIG. 3 shows an example CRPI suite 300. CRPI suite 300 includes search CRPI 302, GUI CRPI 304, RO-selection CRPI 306, tip-generation CRPI 308, tip-review CRPI 310, publication CRPI 312, RO sorting CRPI 314, DPM CRPI 316, component or system mapping CRPI 318, RO mapping CRPI 320, and phrase selection CRPI 322. Descriptions of those CRPI, which are executable by a processor, such as processor 202, are described below.

Search CRPI 302 can comprise program instructions that are executable to search RO database 106 and to select and return, to a processor executing the CRPI 302, an RO, an RO group, or a real-fix tip (published or un-published) stored within RO database 106. CRPI 302 can base the search on search criteria selected or entered using user interface 206. For embodiments in which the repairable item is a vehicle, the search criteria can be vehicle information. As an example, vehicle information can comprise YMM, YMME, or YMMES, where YMM is year/make/model, YMME is year/make/model/engine, and YMMES is year/make/model/engine/system. The year can indicate a model year or the year the vehicle was manufactured. The make can indicate an entity that manufactured the vehicle. The model can indicate a type of vehicle manufactured by the manufacturer. The engine can indicate an engine version within the vehicle. The system can indicate a system within the vehicle to distinguish the vehicle from other vehicles having the same YMME. As an example, the system can indicate whether the vehicle has an automatic or manual transmission.

GUI CRPI 304 can comprise program instructions that are executable to generate a GUI displayable on display device 214. GUI 1200, 500, 600, 700, 800, and 900, described below, can be generated by executing GUI CRPI 304. Those or other GUI generated by executing GUI CRPI 304 can include one or more of the selectors or text entry areas as described herein. Execution of GUI CRPI 304 can cause display device 214 to display a GUI (such as a filter selection interface 1200 shown in FIG. 4) for entering search criteria to search RO database 106, and to cause processor 202 to receive the search criteria entered via GUI 1200. As another example, execution of GUI CRPI 304 can cause display device 214 to display a GUI (such as an RO-Group Selection-Interface 500 shown in FIG. 5) for entering a selection of an RO group located during a search of RO database 106, and to cause processor 202 to receive the selection of the RO group entered using GUI 500. As yet another example, execution of GUI CRPI 304 can cause display device 214 to display a GUI (such as a real-fix creation-interface 600 shown in FIG. 6) for generating real-fix tips to be associated with an RO. Other examples of GUI that can be generated by executing GUI CRPI 304 are also possible.

RO-selection CRPI 306 can comprise program instructions that are executable to select an RO from among the RO stored in RO database 106. Selecting an RO can comprise selecting the RO from among an RO group comprising the RO. Selecting the RO can cause the RO to be displayed using display device 214. A user viewing that display can view the information entered onto or into the RO.

Tip-generation CRPI 308 can comprise program instructions that are executable to generate a real-fix tip. Execution of tip-generation CRPI 308 can include displaying GUI 600 and GUI 800 to enter standard text terms to be a part of the real-fix tip. Execution of tip-generation CRPI 308 can include receiving a selection to submit the real-fix tip for review at coordinator DPM 110. Execution of tip-generation CRPI 308 can include adding to or associating with the real-fix tip search criteria entered to locate an RO.

Tip-review CRPI 310 can comprise program instructions that are executable to review a real-fix tip submitted for review by fix-generator DPM 108. Execution of tip-review CRPI 310 can include selecting the real-fix tip, retrieving the real-fix tip from RO database 106, displaying the real-fix tip using display device 214, receiving a selection to return the real-fix tip for revision and coordinator notes indicating why the real-fix tip is to be revised, and receiving a selection to submit the real-fix tip for review prior to publication of the real-fix tip. If the real-fix tip is ready for publication after an initial submission for review, the selection to return the real-fix tip can be skipped.

Publication CRPI 312 can comprise program instructions that are executable to cause a real-fix tip to be stored in RO database 106 as a published real-fix tip. Storing the real-fix tip in RO database 106 as a published real-fix tip can include storing the real-fix tip in a portion of RO database 106 designated for storing published real-fix tips and deleting the real-fix tip from a portion of RO database 106 for storing unpublished real-fix tips. Additionally or alternatively, storing the real-fix tip in RO database 106 as a published real-fix tip can include storing data, associated with the real-fix tip, that indicates the real-fix tip is published.

RO sorting CRPI 314 can comprise program instructions that are executable to identify repairable item information and to use the repairable item information to select an RO group in which a received RO should be included. If the RO group does not exist, processor 202 can generate the RO group within RO database 106. As an example, identifying the repairable item information can occur from processor 202 reading text from a computer-readable RO. As another example, identifying the repairable item information can occur by entering the information using user interface 206. For embodiments in which the repairable item is a vehicle, the information can comprise YMM, YMME, or YMMES.

DPM CRPI 316 can comprise program instructions that are executable to cause elements of DPM 200 to carry out various functions. As an example, processor 202 can execute DPM CRPI 316 to (i) receive data transmitted to communications interface 204 via a network link, (ii) cause communications interface 204 to transmit data across a network link, (iii) store data into data storage device 212, (iv) logon to a website on the Internet to access RO from RO database 106, (v) presenting data via user interface 206, and (vi) receiving data entered via user interface 206.

Component or system mapping CRPI 318 can comprise program instructions that are executable to map a component of the repairable item or a symptom exhibited by the repairable item to a real-fix tip. Component or system mapping CRPI 318 can be executed while the real-fix tip is being generated. Generating the real-fix tip can include populating the search criteria, used to locate an RO group for which the real-fix tip is being generated, into the real-fix tip. Executing component or system mapping CRPI 318 can allow a fix-generator to change a component or symptom of the search criteria that was populated into the real-fix tip. In that regard, a component or system populated into the real-fix tip can be deleted from the real-fix tip. A different component of system can be selected, e.g., from a list of components and symptoms, to replace the deleted component or symptom.

RO mapping CRPI 320 can comprise program instructions that are executable to compare contents of an un-mapped RO to mapping terms, standard terms, context terms, or data record fields, and to generate a searchable database record associated with the RO or a mapped RO. In one respect, RO mapping CRPI 320 can be executed for each RO as that RO is received or shortly (e.g., within one minute or within one hour) after that RO is received by RO collector DPM 104 or RO database 106. In another respect, RO mapping CRPI 320 can be executed for a group of RO at a designated time per day, per week, per month, or per year. A processor can refer to a schedule to determine the designated time(s) and then execute RO mapping CRPI 320 upon occurrence of the designated time(s).

Phrase selection CRPI 322 can comprise program instructions that are executable to search phrase data based on an RO term (e.g., one or more RO terms) pertaining to a service procedure described on a computer-readable RO and to select a phrase that is associated with the RO term. The phrase data can be arranged like phrase data 1916 stored in a data storage device (see FIG. 19). Phrase selection CRPI 322 can be executed at various times such as at a time before the computer-readable RO is selected for displaying at a DPM or in response to the computer-readable RO being selected for displaying at a DPM.

For embodiments in which RO collector DPM 104, fix-generator DPM 108, coordinator DPM 110, or RO distributor DPM 112 is configured as DPM 200, CRPI 212 in those DPM can comprise one or more of the CRPI of CRPI suite 300, but CRPI 212 is not so limited as CRPI 212 for any one or more of those DPM can comprise other CRPI as well. Table 1 illustrates CRPI usage for an example RO collector DPM 104, fix-generator DPM 108, coordinator DPM 110, and RO distributor DPM 112. In Table 1, "Yes" indicates the CRPI is used in that DPM, whereas "No" indicates that the CRIP is not used in that DPM. Any one of the example DPM, or even RO database 106, can include each CRPI of CRPI suite 300.

TABLE 1

| DPM | CRPI (302) | CRPI (304) | CRPI (306) | CRPI (308) | CRPI (310) | CRPI (312) | CRPI (314) | CRPI (316) | CRPI (318) | CRPI (320) | CRPI (322) |
|---|---|---|---|---|---|---|---|---|---|---|---|
| DPM (104) | Yes | Yes | No | No | No | No | Yes | Yes | No | Yes | Yes |
| DPM (108) | Yes | Yes | Yes | Yes | No | No | No | Yes | Yes | Yes | Yes |
| DPM (110) | Yes | Yes | No | No | Yes | Yes | No | Yes | Yes | Yes | Yes |
| DPM (112) | Yes | Yes | Yes | No | No | No | No | Yes | No | Yes | Yes |

Figure 12:
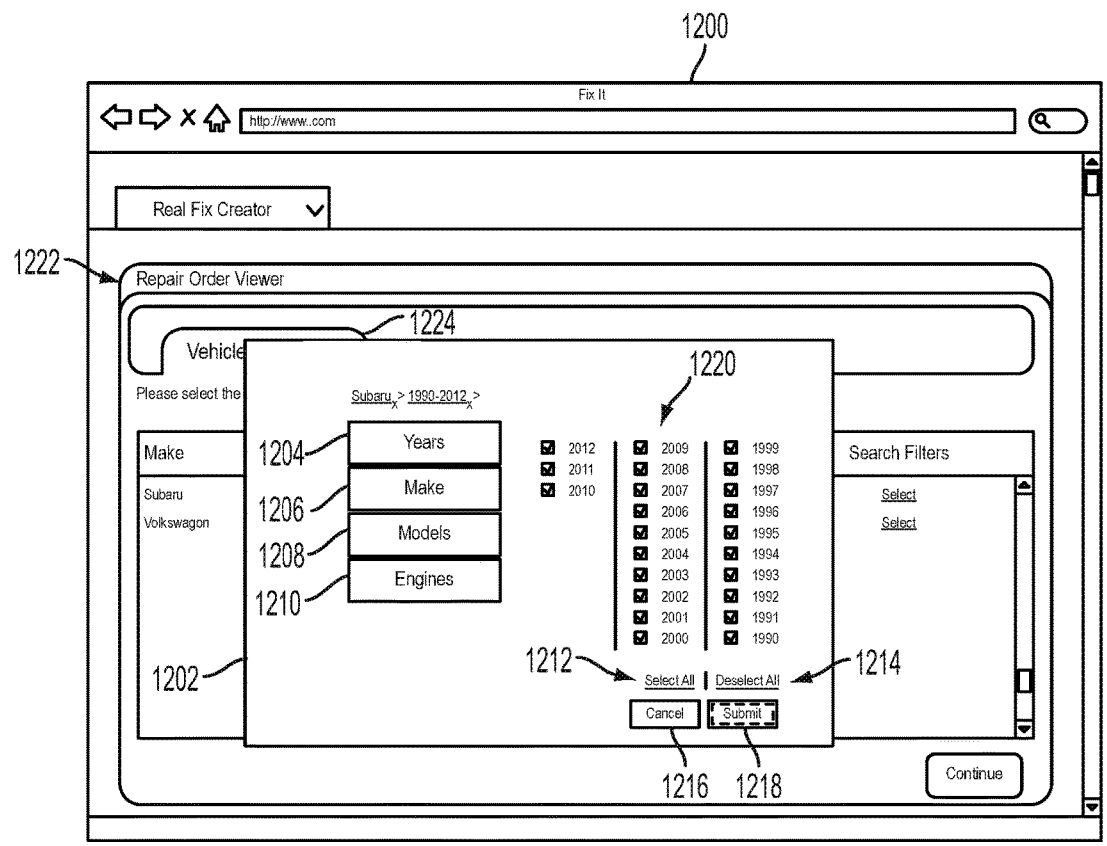
FIG. 12 shows another graphical user interface in accordance with one or more example embodiments.
Figure 13:
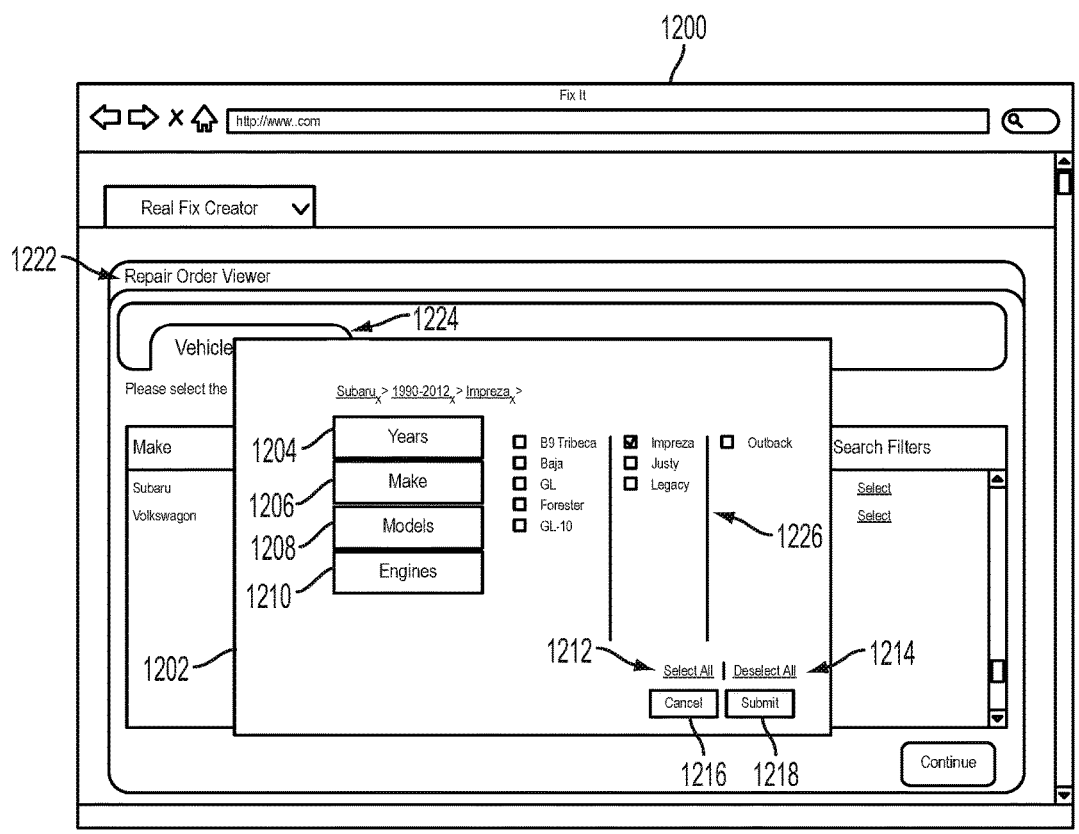
FIG. 13 shows another graphical user interface in accordance with one or more example embodiments.

Turning to FIG. 12 and FIG. 13, those figures show an example GUI 1200 in accordance with one or more of the example embodiments described herein. GUI 1200 can be referred to as a filter selection interface. A filter selection interface can provide one or more selection windows for selecting filter criteria. The filter criteria selected using the filter selection interface (GUI 1200) can be used to search RO database 106 to locate RO or an RO group comprising RO that include data matching at least a portion of the selected filter criteria. GUI 1200 can include an RO-viewer-display 1222, a selection-tab 1224 to select filter criteria pertaining to a vehicle, and a filter-selection window 1202 (e.g., a pop-up window).

As shown in FIG. 12, filter-selection window 1202 can includes window selectors 1204, 1206, 1208, and 1210 and model year selectors 1220 for the model years 1990 through 2012. Model year selectors 1220 can include more or fewer years or different years than shown in FIG. 12. Filter-selection window 1202 can include a multi-selector 1212 to select, using a single selection, all of the filter criteria currently selectable individually via filter-selection window 1202. Filter-selection window 1202 can include a de-selector 1214 to de-select, using a single selection, all filter criteria presently selected via filter-selection window 1202. Filter-selection window 1202 can include a cancel selector 1216 to close the filter-selection window 1202 prior to submitting any filter criteria for searching RO database 106, and a submit selector 1218 to enter selected filter criteria (such as model year, vehicle make, vehicle model, or engine identifier) for searching RO database 106.

Selection of a window selector 1204, 1206, 1208 or 1210 can cause filter-selection window 1202 to change from displaying first selectable filter criteria to displaying second selectable filter criteria. The remainder of this paragraph describes the selectable filter criteria that can be displayed upon selection of a window selector 1204, 1206, 1208 or 1210. Selection of window selector 1204 can cause filter-selection window 1202 to display the selectable model years selectors 1220. Selection of window selector 1206 can cause filter-selection window 1202 to display selectable vehicle make identifiers, such as Subaru, Toyota, Ford, Chevrolet, and Cadillac. Selection of window selector 1208 can cause filter-selection window 1202 to display selectable vehicle model identifiers, such as the selectable model identifiers 1226 shown in FIG. 13. Selection of window selector 1210 can cause filter-selection window 1202 to display selectable engine indicators that indicate engines used by a vehicle manufacturer. The engine identifiers can include an engine displacement size, such as 5.7 Liter (L), or an orientation, such as V6, inline 6, or V8.

Figure 4:
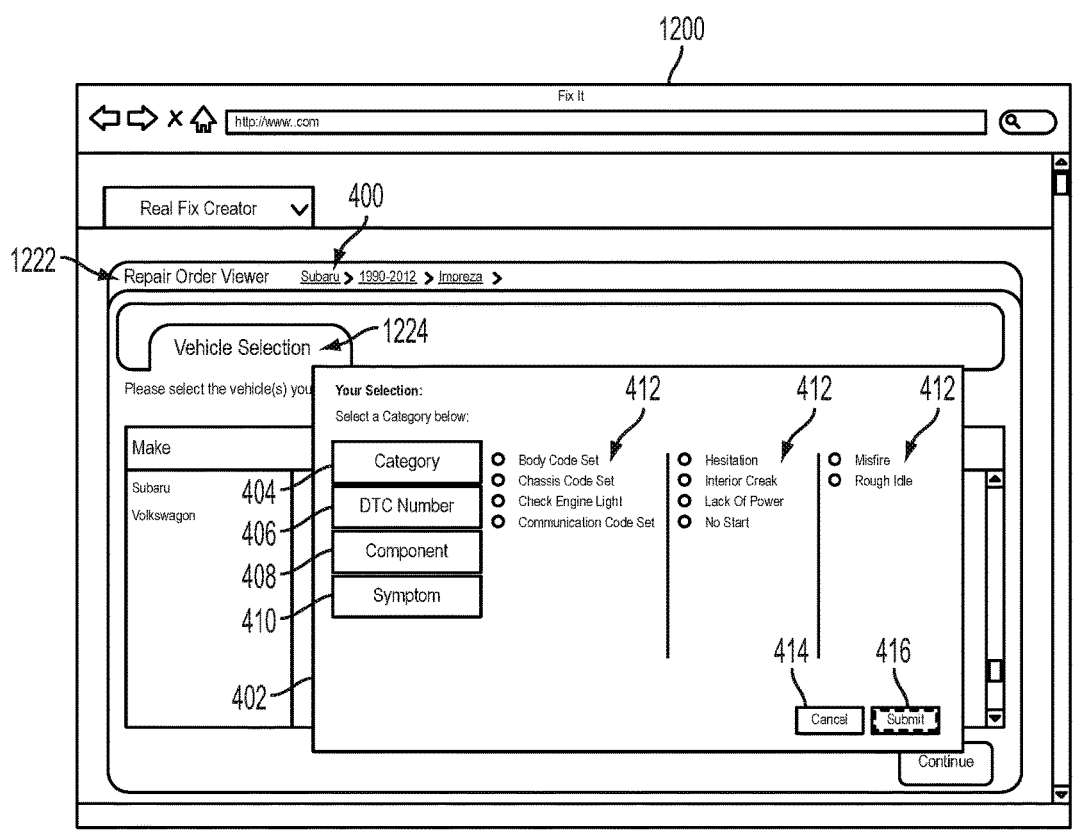
FIG. 4 shows a graphical user interface in accordance with one or more example embodiments.

Turning to FIG. 4, that figure shows an embodiment of GUI 1200 in which the filter selection interface includes RO-viewer-display 1222, selection-tab 1224, filter criteria indicators 400, and a filter selection-window 402 to select additional filter criteria. As filter criteria are selected using filter-selection window 1202 or filter selection-window 402, the selected filter criteria can be presented using filter criteria indicators 400. As shown in FIG. 4, filter criteria indicators 400 indicate the following filter criteria have been selected: a vehicle make (that is Subaru), model years (that is, 1990-2012), and a vehicle model (that is, Impreza). In accordance with example embodiments in which the repairable item is an item other than a vehicle, selection-tab 1224 can indicate a selected repairable item other than a vehicle, and category selection-window 402 can present selectable filter criteria other than filter criteria associated with a vehicle.

As shown in FIG. 4, filter-selection window 402 can include filter-criteria category selectors 404, 406, 408, and 410. Selection of one of those selectors can cause category selection-window 402 to display filter criteria selectable for searching RO database 106. The filter criteria displayed using category selection-widow 402 after selecting category selector 404 can, e.g., include vehicle systems within the selected vehicle, such as a vehicle braking system, a heating, ventilation and air conditioning (HVAC) system, an engine emissions system, a fuel system, a check engine light system or some other vehicle system. The filter criteria displayed using category selection-widow 402 after selecting category selector 406 can, e.g., include diagnostic trouble code (DTC) numbers (such as P0149) with or without a description of the DTC numbers (such as Fuel Timing Error). The filter criteria displayed using category selection-widow 402 after selecting category selector 408 can, e.g., include component identifiers of components located on, at, or within a selected vehicle. The filter criteria displayed using category selection-widow 402 after selecting category selector 410 can, e.g., include symptom that may be exhibited in or by a selected vehicle. An example set of symptoms 412 that can be exhibited in or by the selected vehicle is shown on filter-selection window 402.

Filter-selection window 402 can include a cancel selector 414 to close the filter-selection window 402 prior to submitting, using filter-selection window 402, any filter criteria for searching RO database 106, and a submit selector 416 to enter filter criteria, selected using filter-selection window 402, for searching RO database 106. Similar to filter-selection window 1202, filter-selection window 402 can include a multi-selector to select, using a single selection, all of the filter criteria currently selectable individually via filter-selection window 402. Similar to filter-selection window 1202, filter-selection window 402 can include a de-selector 1214 to de-select, using a single selection, all filter criteria presently selected via filter-selection window 1202.

Figure 5:
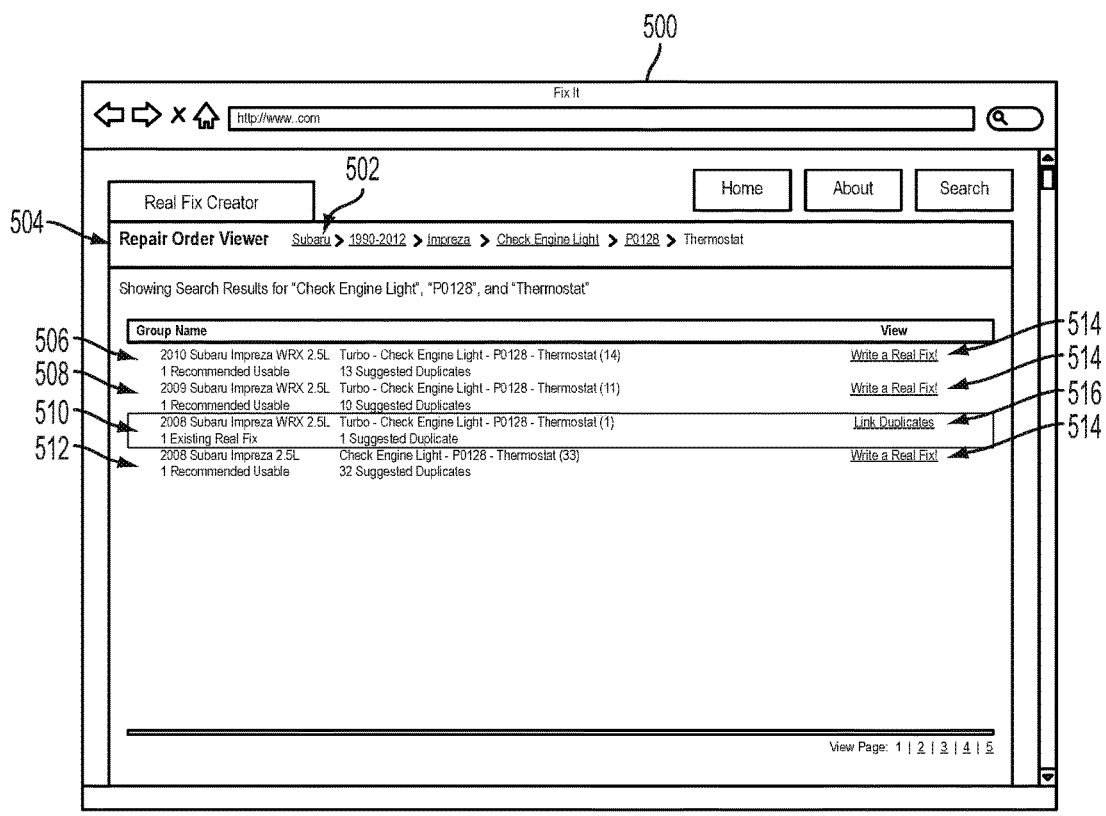
FIG. 5 shows another graphical user interface in accordance with one or more example embodiments.

Next, FIG. 5 shows an example GUI 500 in accordance with example embodiments in which four RO groups 506, 508, 510, and 512 were located during a search of RO database 106 for search criteria comprising a vehicle make (Subaru), model years (1990-2012), a vehicle model (Impreza), a symptom (check engine light), a DTC (P1028), and a component (Thermostat). RO groups 506, 508, and 510 are for Subaru Impreza WRX with 2.5 L turbocharged engine, model year 2010, 2009, and 2008, respectively. RO group 512 is for Subaru Impreza with a 2.5 L non-turbo charged engine.

GUI 500 can display a number of RO discovered for each RO-group during a search of RO database 106. In FIG. 5, those numbers are shown in parenthesis. For instance thirty-three (33) RO were located for RO group 512. In accordance with an embodiment in which RO provider 102 comprises multiple RO providers located throughout the United States and Canada, thirty-three distinct RO providers could each have provided one of the thirty-three RO located for RO group 512. Alternatively, a single RO provider could have provided more than one of the thirty-three RO.

As shown in FIG. 5, GUI 500 can display that a recommended usable RO or an existing real-fix tip has been located, and can display a number of suggested duplicate RO. If no suggested duplicate RO, recommended usable RO, or existing real-fix-tip is located for an RO group, the displayed RO group can indicate quantities of those items as "zero" or "0." GUI 500 can also display a number of RO that have already been classified as duplicate RO. For instance, GUI 500 indicates that five duplicate RO were located within RO database 106 for RO group 510.

Figure 15:
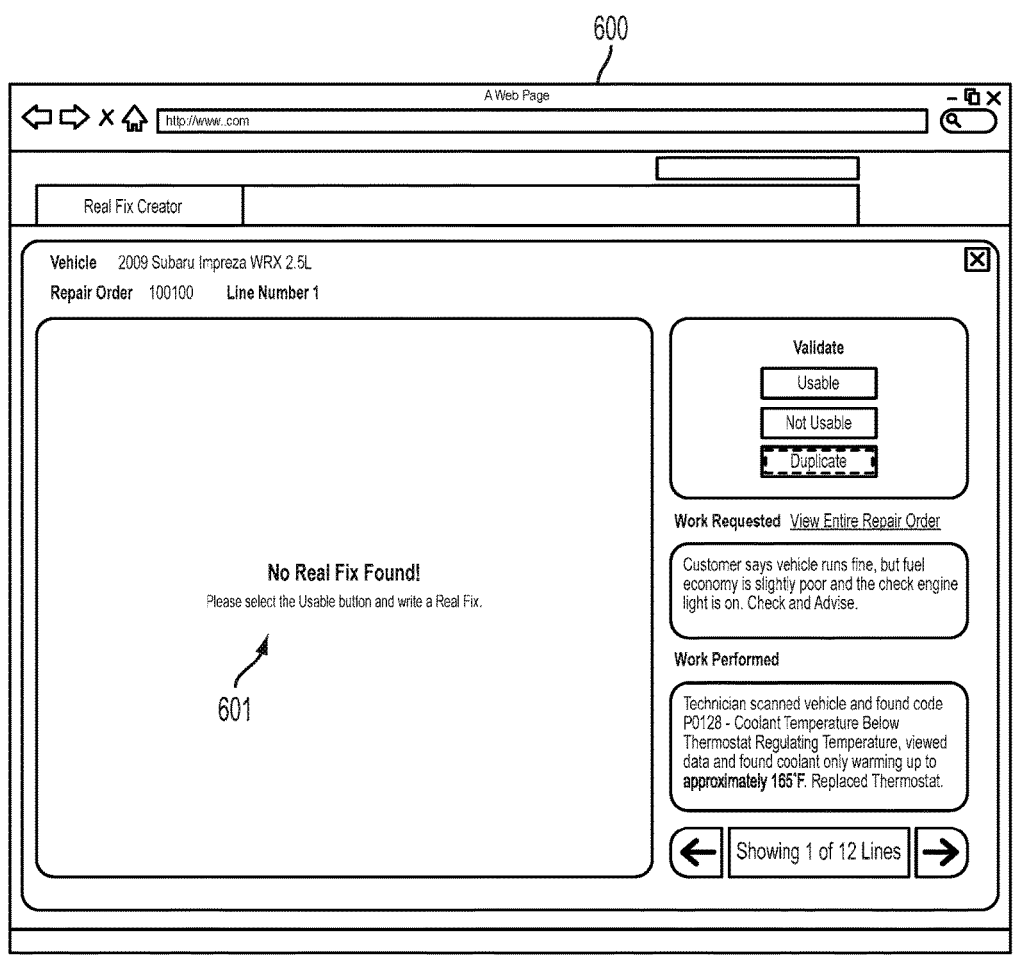
FIG. 15 shows another graphical user interface in accordance with one or more example embodiments.

GUI 500 provides an interface to select an RO Group. In FIG. 5, selection interfaces 514 (Write a Real Fix) can be used to select an RO group in which a real-fix-tip has not yet been generated for the RO of that RO Group or for the RO discovered for the given search criteria used to locate the RO Group. Selecting an RO group via a selection interface 514 can cause display device 214 to display (as shown in FIG. 15) GUI 600 with a message 601 prompting a user to enter a real-fix-tip since no real-fix tip was found for the selected RO group. In FIG. 5, selection interface 516 (Link Duplicates) can be used to select an RO Group in which a real-fix-tip has been generated for the RO of that RO Group or for the RO discovered for the given search criteria used to locate the RO Group.

Duplicate RO lines within an RO group can be linked to an existing real-fix tip. Doing so can increase the value of information available to repair technicians that access RO from RO database 106. Multiple repair scenarios for a set of symptoms entered to search RO database 106 can be retrieved from RO database 106 and presented to RO receiver 114. Each of the repair scenarios can be a confirmed repair scenario from a usable or duplicate RO. This can be beneficial to a technician since the technician can weigh possible outcomes and probabilities of multiple repair scenario for the symptoms the repairable item, the technician is working on, is experiencing.

Figure 6:
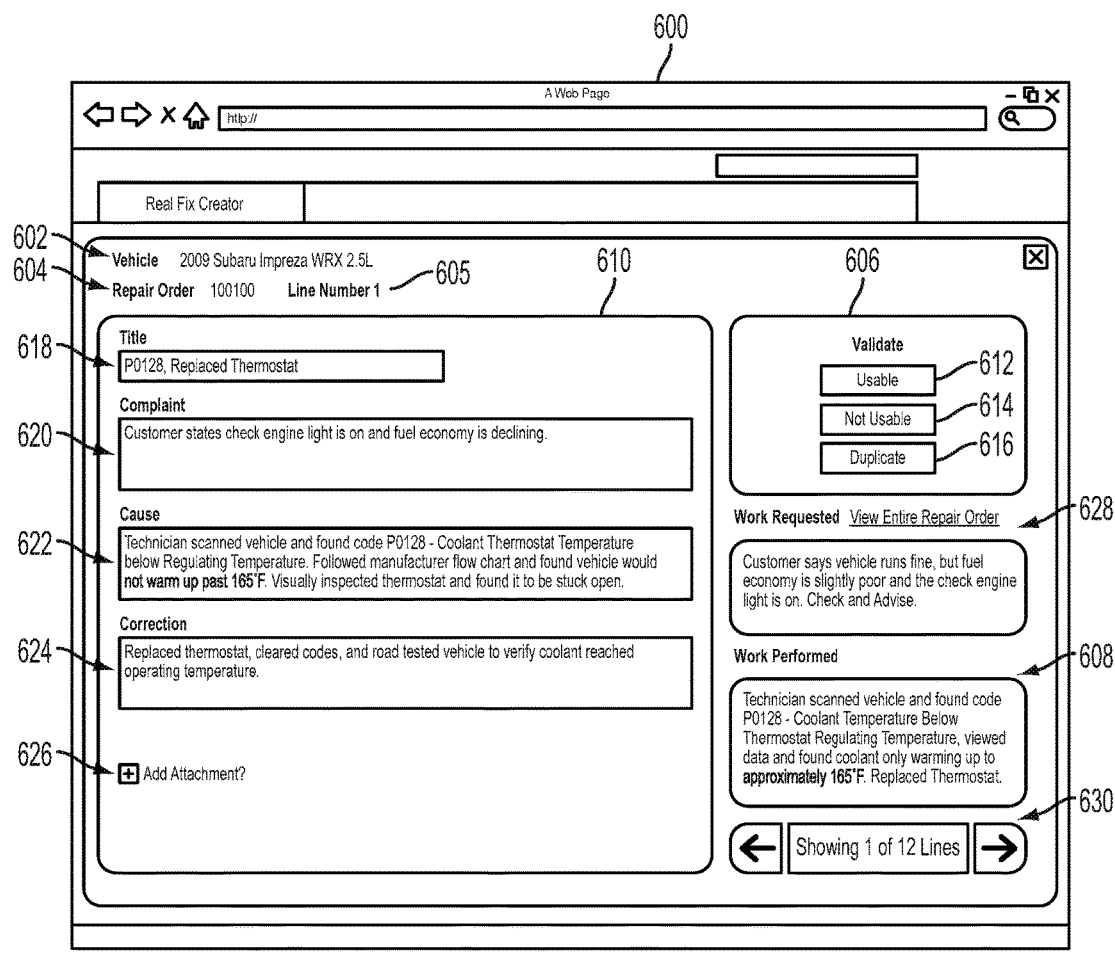
FIG. 6 shows another graphical user interface in accordance with one or more example embodiments.

Next, FIG. 6 shows GUI 600 in accordance with one or more of the example embodiments described herein. GUI 600 can be referred to as a real-fix creation-interface. GUI 600 can include a repairable item description 602, an RO identifier 604, a line identifier 605, a validation selection area 606, an RO information area 608, and a text entry area 610. GUI 600 can be used to enter text to generate a real-fix-tip or to generate at least a portion of the real-fix tip. Search criteria for a given RO group can be included as part of the real-fix tip or associated with the real-fix tip.

The real-fix tip can be associated with a subject RO. A subject RO can be stored within and retrieved from RO database 106. For purposes of this description, a subject RO is an RO identified by RO identifier 604 or the RO from which information is presented in RO information area 608. In the latter, the information presented in RO information area 608 may be service procedure information within a distinct section of the subject RO. To distinguish between multiple sections of subject ROs, each distinct section comprising service procedure information regarding distinct service requests can be assigned a unique RO line number, or more simply a "line" or "line number." The assigned line number can be displayed at line identifier 605. a single RO can be assigned one or more RO line numbers.

GUI 600 can include a line selector 630 to cause display device 214 to switch between the RO within an RO group or between lines on a single RO. By way of example, line selector 630 indicates "1 of 12" where the "1" indicates a first RO line among a number of RO lines within an RO group, and the "12" indicates the number of RO lines within the RO group.

A DPM in system 100 can rank the RO lines within an RO group based on likelihood of each RO line being most suitable for generating a real-fix-tip, and the DPM can position the RO lines within the RO group according to that ranking. In accordance with at least some embodiments, an RO line displayed by GUI 600 when line selector 630 displays a low first number, in comparison to an RO line displayed by GUI 600 when line selector 630 display a greater first number, is more likely to be suitable for generating a real-fix tip.

The likelihood of generating a real-fix tip from an RO line can be based on a number of characters describing "work requested" or "work performed." A data record field, referred to below as "Field R," can be compared to similar fields to determine the likelihood of generating a real-fix-tip. In alternative embodiments, some or all of the line numbers of an RO group are not ranked. Line selector 630 can be used to select a next RO within the RO group. Selection of the next RO can occur after a validation selection from validation selection area 606 occurs.

Repairable item description 602 describes a vehicle, in particular, a 2009 Subaru Impreza WRX 2.5 L, wherein "2009" is a model year of the vehicle, "Subaru" is a manufacturer of the vehicle, "Impreza WRX" is a model identifier for the vehicle, and "2.5 L" is an engine identifier for the vehicle. Repairable item description 602 can describe repairable items other than a vehicle. Information, other than model year, manufacturer, model identifier, or engine identifier, can be used to describe the other types of repairable items.

RO information area 608 can include information that was entered onto the subject RO. The information entered onto the subject RO can include, e.g., "Work Requested" and "Work Performed." As an example, a technician that worked on the repairable item or a service manager at a repair location can enter the information onto an RO. The RO information provided to RO database 106 from RO collector DPM 104 can indicate which information on the RO represents the "Work Performed" and which information represents the "Work Requested." An RO can comprise multiple Work Requested and Work Performed sections. Each pair of Work Requested and Work Performed sections can be identified as distinct lines on the RO.

RO information area 608 can be arranged in various configurations. In addition to displaying the "Work Requested" and the "Work Performed" described on the subject RO, RO information area 608 can include a selector 628 "View Entire Repair Order" that is selectable to view the subject RO in its entirety. Selector 628 can be a hyperlink. Selecting selector 628 can cause processor 202 to retrieve and display the subject RO or the subject RO line. In one respect, the retrieved and displayed RO can be an original un-mapped RO. In another respect, the retrieved and displayed RO can be a mapped RO that includes one or more standard terms that replaced one or more non-standard terms of the original un-mapped RO.

Retrieving the subject RO can include retrieving an SQL file or XML file that embodies the subject RO. Alternatively, retrieving the subject RO can include retrieving an image of the subject RO from RO database 106 Display device 214 can display the subject RO or subject RO line retrieved from RO database 106. Another selector (not shown), displayed with the subject RO or the subject RO line, can be selected to cause display device 214 to switch from displaying the subject RO or subject RO line to displaying GUI 600.

Validation selection area 606 includes the following validation selections: a usable RO selection 612, a non-usable RO selection 614, and a duplicate RO selection 616. GUI 600 is configured to receive a validation selection for a subject RO. A validation selection, selected for the subject RO, can be provided to processor 202 for storing in RO database 106 as a validation selection associated with the subject RO. A data record field, such as Field S described below, can record the validation selection.

Selecting usable RO selection 612 for the subject RO can cause GUI 600 to transition from a mode for selecting a validation selection to a mode for entering text to generate a real-fix-tip for the subject RO. That transition can include display device 214 switching from displaying GUI 600 to displaying a GUI 800 (shown in FIG. 8). In accordance with one or more of the example embodiments, usable RO selection 612 can be un-selectable if processor 202 determines that the subject RO is a recommended duplicate RO for which a real-fix-tip been generated.

Selecting duplicate RO selection 616 for the subject RO can cause GUI 600 to transition from the mode for selecting a validation selection to a mode for selecting a previously-generated real-fix-tip to associate with the subject RO. That transition can include display device 214 switching from displaying GUI 600 to displaying a GUI 700 (shown in FIG. 7). In accordance with some example embodiments, duplicate RO selection 616 can be un-selectable if processor 202 determines that a real-fix-tip has not yet been generated for the subject RO or for any other RO within an RO Group including the subject RO.

Selecting non-usable RO selection 614 for the subject RO can cause processor 202 to store data that indicates the subject RO is not usable for the search criteria entered to locate the subject RO. Additionally, processor 202 can cause display device 214 to transition from displaying GUI 600 to displaying GUI 1200 so that another subject RO can be selected for determining whether to classify the other subject RO as a usable RO, duplicate RO, or non-usable RO.

In accordance with at least some example embodiments, classifying the subject RO as a non-usable RO prevents the subject RO from being presented in search results of a search of RO database 106 using the search criteria that were used to locate the subject RO, after the subject RO was classified as non-usable for those search criteria. However, if the subject RO includes multiple RO lines with distinct service procedure information, then selecting non-usable RO selection 614 can cause the RO line with non-usable service procedure information to be classified as a non-usable RO line rather than classifying the entire RO as a non-usable RO. One or more other RO lines on that subject RO may include usable service procedure information.

Text entry area 610 can be arranged in any of a variety of configurations. In accordance with an example embodiment in which the subject RO pertains to a vehicle, text entry area 610 can include a title text entry box 618 for entering a title for a real-fix-tip, a complaint text entry box 620 for entering text to identify a complaint for the real-fix-tip, a cause text entry box 622 for entering text to identify a cause for the real-fix-tip, a correction text entry box 624 for entering text to identify a correction for the real-fix-tip, and an attachment selector 626 for selecting to enter an attachment (e.g., a document saved in a portable document format (PDF)) for the real-fix-tip. Entering the complaint, cause and correction into text entry area 610 can be referred to as entering real fix information as a 3C's real fix. A person skilled in the art will understand that text entry area 610 can include one or more different text entry boxes for subject RO that pertain to repairable items other than vehicles. Text entered into a text entry box can be populated into a field of a real-fix tip.

Figure 7:
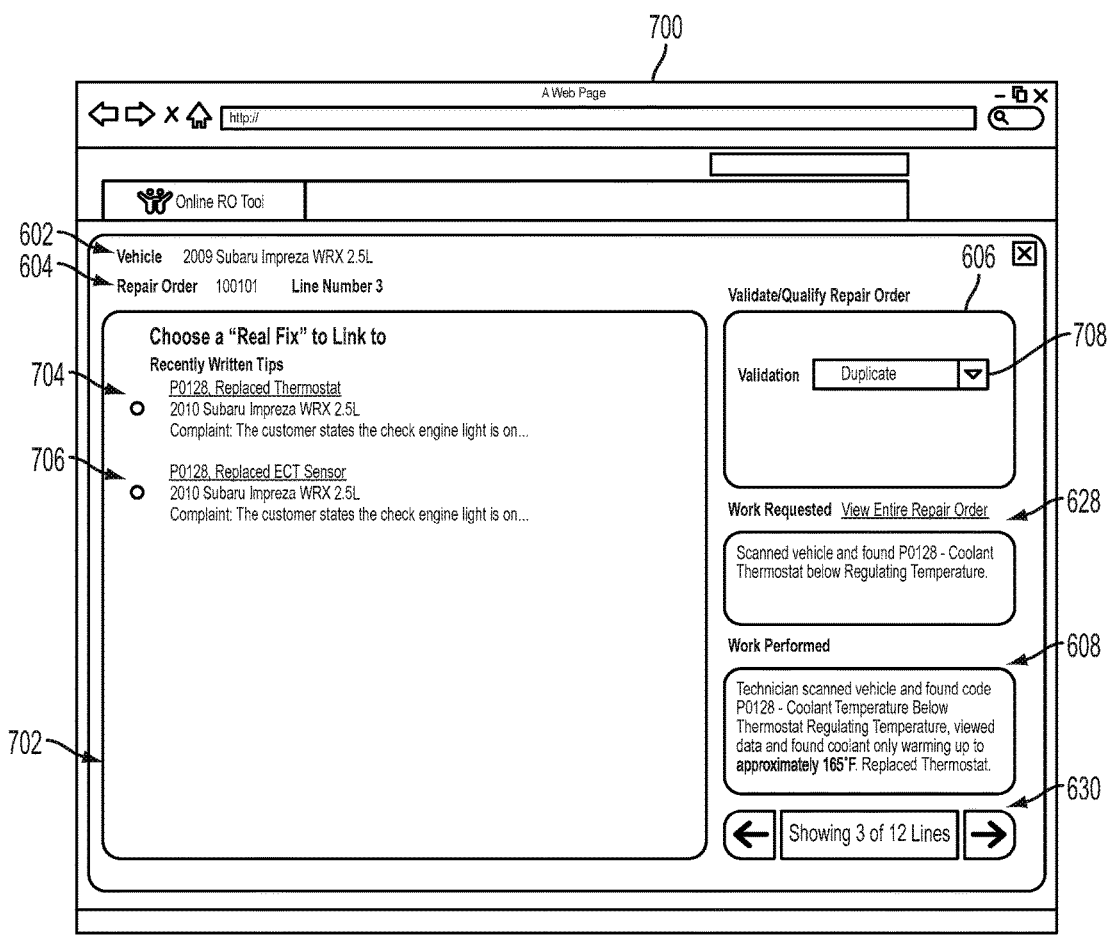
FIG. 7 shows another graphical user interface in accordance with one or more example embodiments.

Next, FIG. 7 shows GUI 700 in accordance with example embodiments in which a subject RO or a subject RO line was classified as a duplicate RO (e.g., by selecting duplicate RO selection 616 for the subject RO or subject RO line). As shown in FIG. 7, GUI 700 can include a real-fix-tip selection area 702, and validation selection area 606 can include a drop-down box 708 from which a validation selection can be selected.

Real-fix-tip selection area 702 includes selectable real-fix-tips 704 and 706. A portion of each of those real-fix-tips can be displayed. Alternatively, no portion of the real-fix-tips or the entire real-fix-tips can be displayed within real-fix-tip selection area 702. Either of real-fix-tips 704 and 706 can be selected to view the entire tip prior to one of those two tips being selected as a real-fix-tip to associate with the subject RO. Processor 202 can receive a selection of a real-fix-tip and cause RO database 106 to associate the subject RO with the selected real-fix-tip. As an example, each real-fix-tip can be comprise or be associated with an identifier, such as a numeric identifier. RO database 106 can store the real-fix-tip identifier along with the subject RO in order to associate the subject RO with the selected real-fix-tip. As an example, the real-fix-tip identifier can be stored in Field I of a data record associated with the subject RO.

As shown in RO information area 608, the Work Performed Area indicates that a thermostat was replaced. Real-fix tip 704 states P1028, Replaced Thermostat. Therefore, real-fix tip 704 can be an appropriate real-fix tip for the subject RO 100101. Real-fix tip 704 can be selected for display by display device 214 prior to confirming that the entirety of real-fix tip is appropriate for associating with the subject RO.

Figure 8:
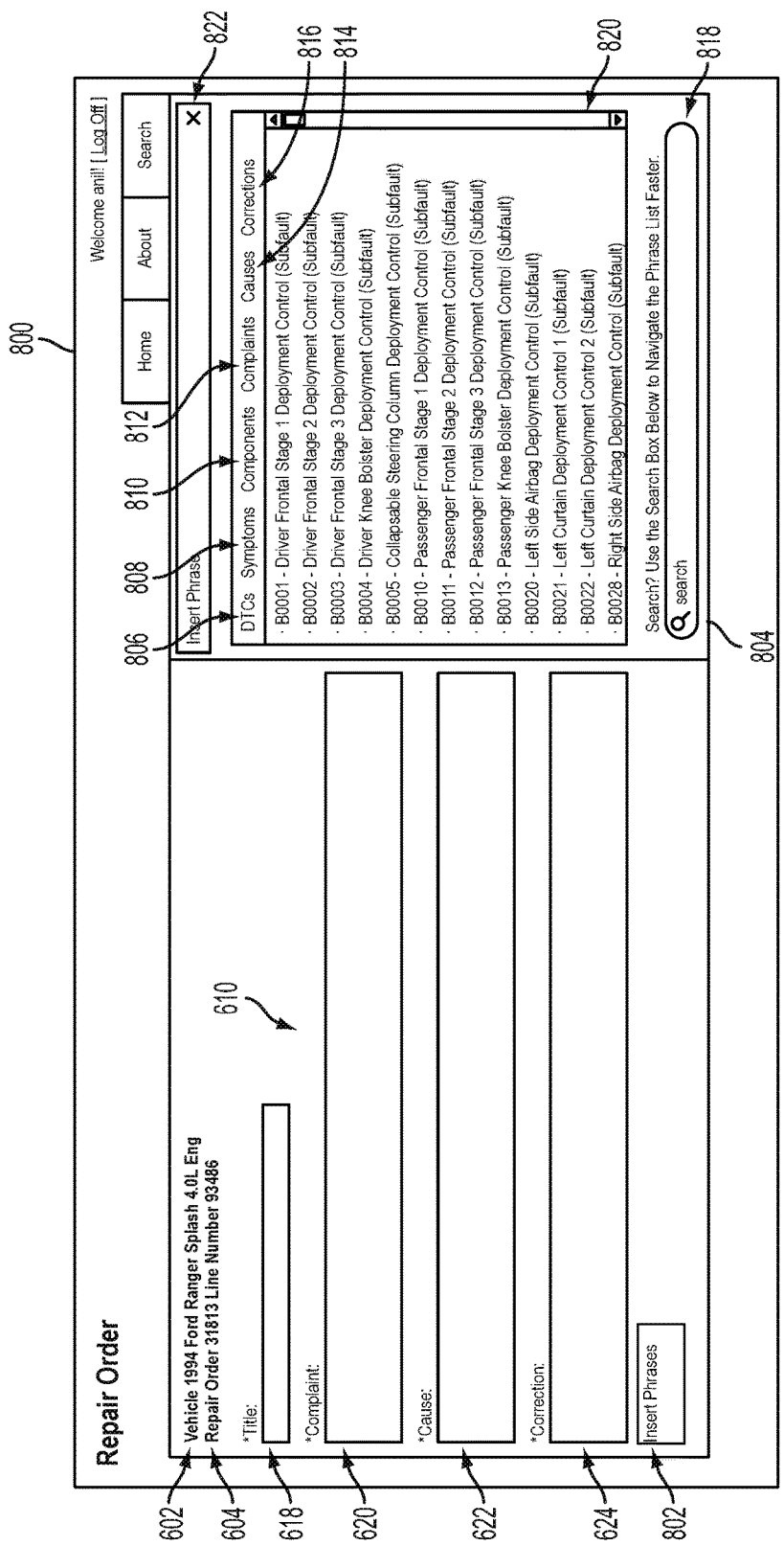
FIG. 8 shows another graphical user interface in accordance with one or more example embodiments.

Next, FIG. 8 shows GUI 800 in accordance with one or more example embodiments in which a subject RO was classified as a usable RO (e.g., by selecting usable RO selection 612 for the subject RO). By way of example, the subject RO shown in FIG. 8 is assigned RO number 31813 and line number 93486, and pertains to a 1994 Ford Ranger Splash with a 4.0 L engine. GUI 800 can display RO that pertain to other repairable items.

GUI 800 includes an insert phrases selector 802 that, upon selection, causes display device 214 to display an insert phrases area 804 (e.g., a pop-up window on or within GUI 800). Insert phrases area 804 can include standard phrases that are selectable from a standard phrase list (SPL) to fill out various fields in text entry area 610.

Insert phrases area 804 can include multiple standard phrase lists (SPLs). Those SPLs can include a diagnostic trouble codes (DTCs) SPL 806, a symptoms SPL 808, a components SPL 810, a complaints SPL 812, a causes SPL 814, and a corrections SPL 816. Insert phrases area 804 can include a search box 818 for faster navigation of an SPL, a slider bar 820 to scroll up or scroll down an SPL displayed by insert phrases area 804, and an SPL exit selector 822 to cause processor 202 to stop displaying insert phrases area 804. The SPLs of insert phrase area 804 can be populated with phrases stored within phrase data 1916 (shown in FIG. 19).

DTCs SPL 806 can include standard DTC descriptions of DTCs settable by or within a repairable item. In FIG. 8, GUI 800 is displaying standard DTC descriptions of DTCs ranging from B0001 to B0028. Standard DTC descriptions of other DTCs settable by or within the repairable item can be displayed by using slider bar 820. Any one or more of those standard DTC descriptions displayed by GUI 800 can be selected for entry into a field of text entry area 610. As an example, the standard description of DTC B0011 can be selected for placement into complaint text entry box 620.

Selecting a standard phrase for placement into a text entry box of text entry area 610 for each subject RO that pertains to common repairable items having a common complaint can be beneficial to users of system 100. One such benefit is that an increased number of RO are associated with a common complaint. A search of RO database 106 using the common complaint as search criteria can lead to finding more RO in RO database 106 that match the search criteria.

Figure 16:
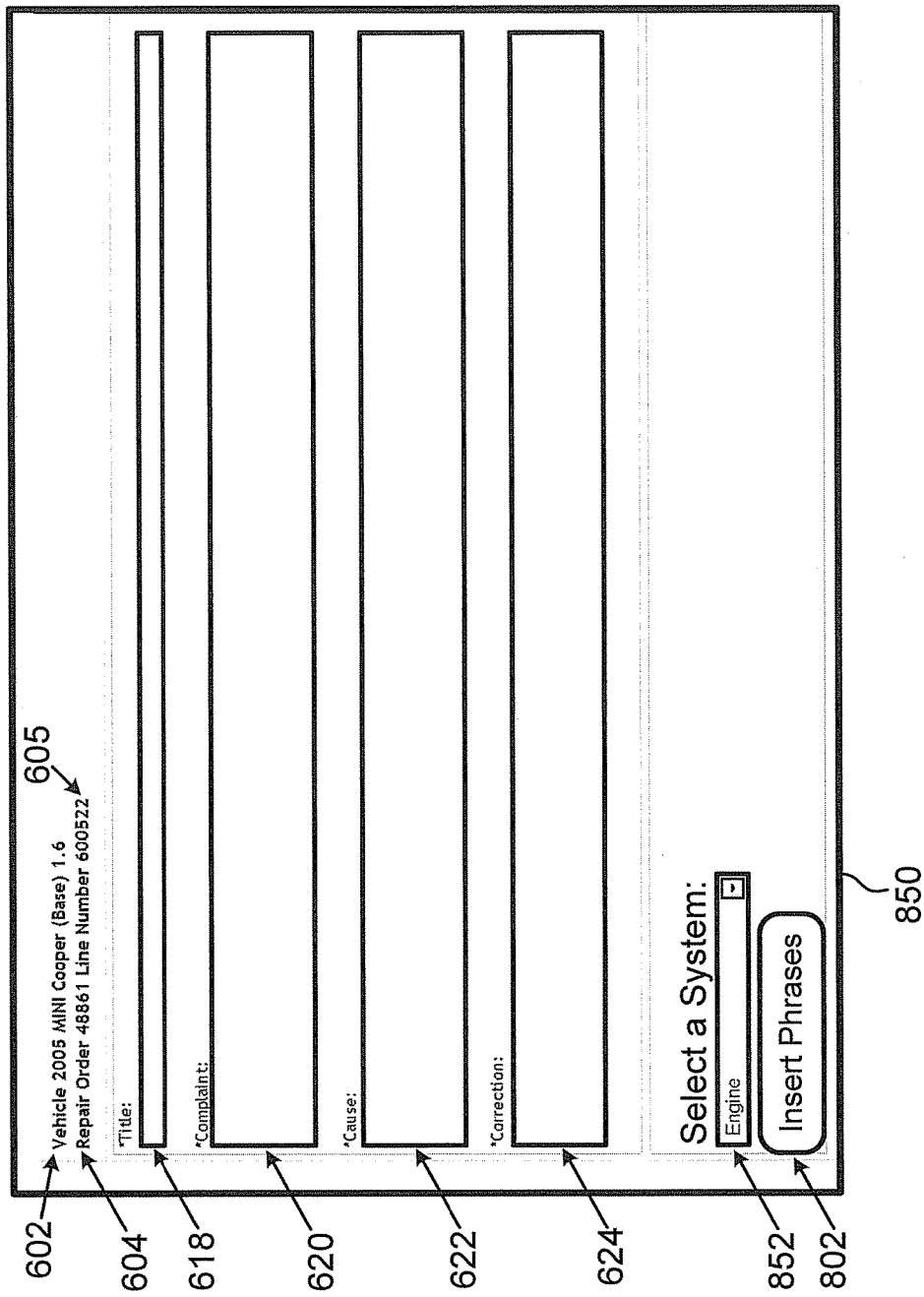
FIG. 16 shows another graphical user interface in accordance with one or more example embodiments.
Figure 17:
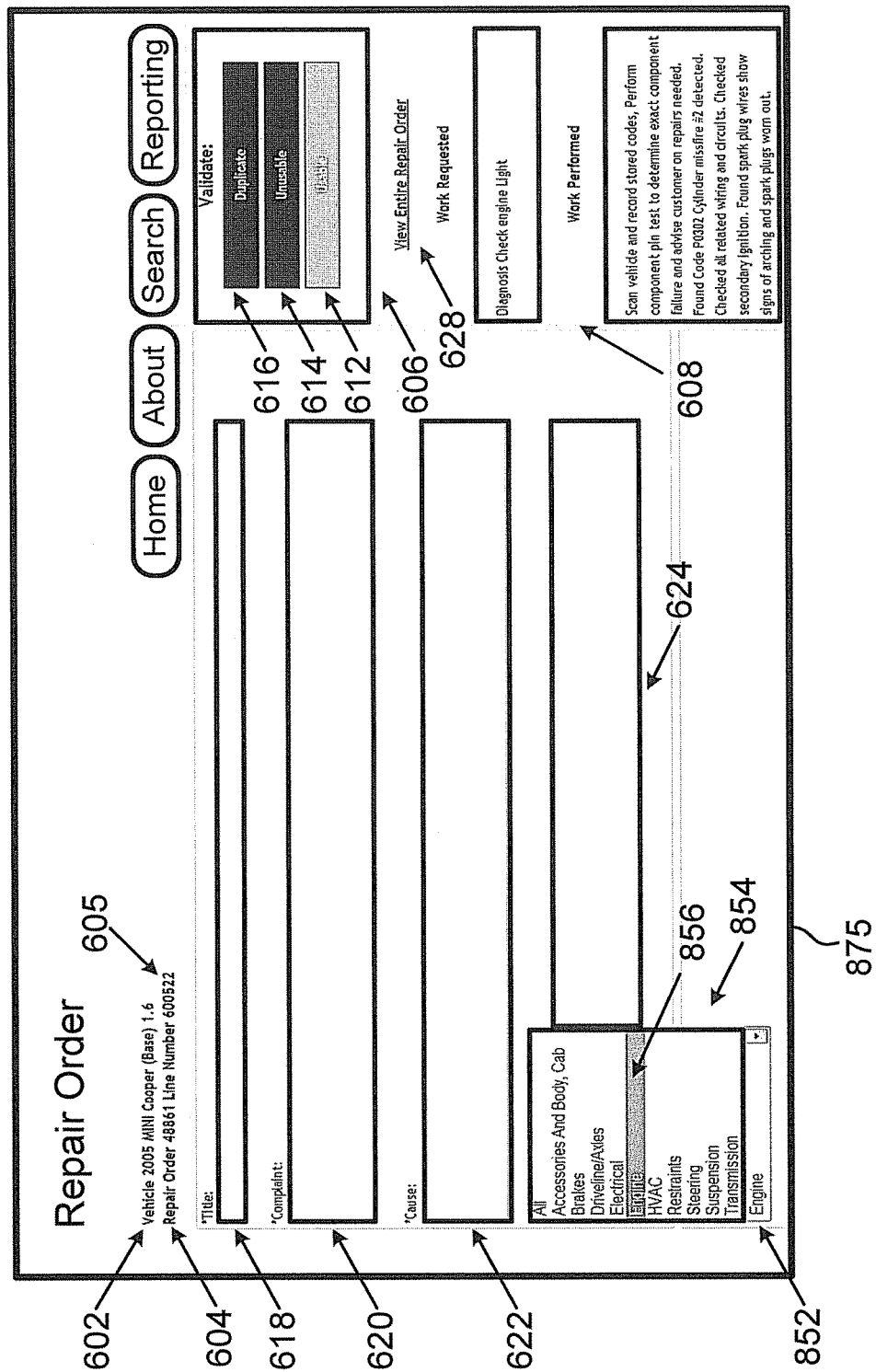
FIG. 17 shows another graphical user interface in accordance with one or more example embodiments.

Next, FIG. 16 and FIG. 17 show GUI 850 and GUI 875, respectively, in accordance with one or more example embodiments in which an RO was classified as a usable RO. Those GUI display a subject RO that is assigned RO number 48861 and a line number 600522, and that pertains to a 2005 Mini Cooper (Base) with a 1.6 L four cylinder engine. Other RO can also be displayed by GUI 850 or GUI 875.

GUI 850, as shown in FIG. 16, includes a system selector 852. System selector 852 can present selectable systems using a pop-up window or using some other arrangement, such as a set of check boxes. A system selected using system selector 852 can be used to classify a real-fix-tip entered via GUI 850. The system classification can indicate a publication class of real-fix-tips under which the real-fix tip should be published. FIG. 17 shows example publication classes other than engine. GUI 850 also includes repairable item description 602, RO identifier 604, line identifier 605, title text entry box 618, complaint text entry box 620, cause text entry box 622, correction text entry box 624, and insert phrases selector 802. GUI 850 can include other elements of GUI 600, but those elements are not shown in FIG. 16.

GUI 875, as shown in FIG. 17, includes system selector 852 and pop-up window 854 presenting selectable systems. Selector 216 can trigger selector bar 856 to move up or down within pop-up window 854 to select a system. GUI 875 also includes repairable item description 602, RO identifier 604, line identifier 605, validation selection area 606, RO information area 608, usable RO selection 612, non-usable RO selection 614, duplicate RO selection 616, title text entry box 618, complaint text entry box 620, cause text entry box 622, correction text entry box 624, and selector 628. GUI 875 can also include user navigation selectors, such as the "Home," "About," "Search," and "Reporting" selectors shown in the upper-right corner of GUI 875.

Returning to FIG. 5, GUI 500 can display numbers that indicate how many RO or RO lines are within each RO group. In FIG. 5, those numbers are shown within parenthesis. For example, eleven RO or RO lines are within RO group 508. After validating each RO or RO line within an RO group, the validated RO group or a real-fix tip generated for the RO group can be submitted for review and publishing. Submission of the RO group or the real-fix tip can occur in various ways. For example, submission of the RO group can occur automatically when the validation selection of the last RO within the RO group is selected. As another example, a GUI, such as GUI 500, 600, 700, 800 or 900, can include a submit-RO-group selector (not shown). The RO groups that have been submitted for review, but not yet published for presenting to RO receiver 114, can be shown on a GUI displayable at a coordinator-terminal of DPM 110. A coordinator can select an RO group from that GUI in order to review a real-time fix or validation selections for RO within the selected RO group. That review can include displaying a quality control (QC) GUI.

A fix-generator terminal of DPM 110 can include a cancel-submission selector on a GUI to allow a fix-generator to cancel submission of the RO group for review and publication. Use of the cancel-submission selector can be used if the fix-generator feels the need to revise a validation selection or the real-fix tip for a submitted RO group. Canceling submission of a submitted RO group can cause that RO group to be returned to fix-generator DPM 108 for revising by a fix-generator.

Figure 9:
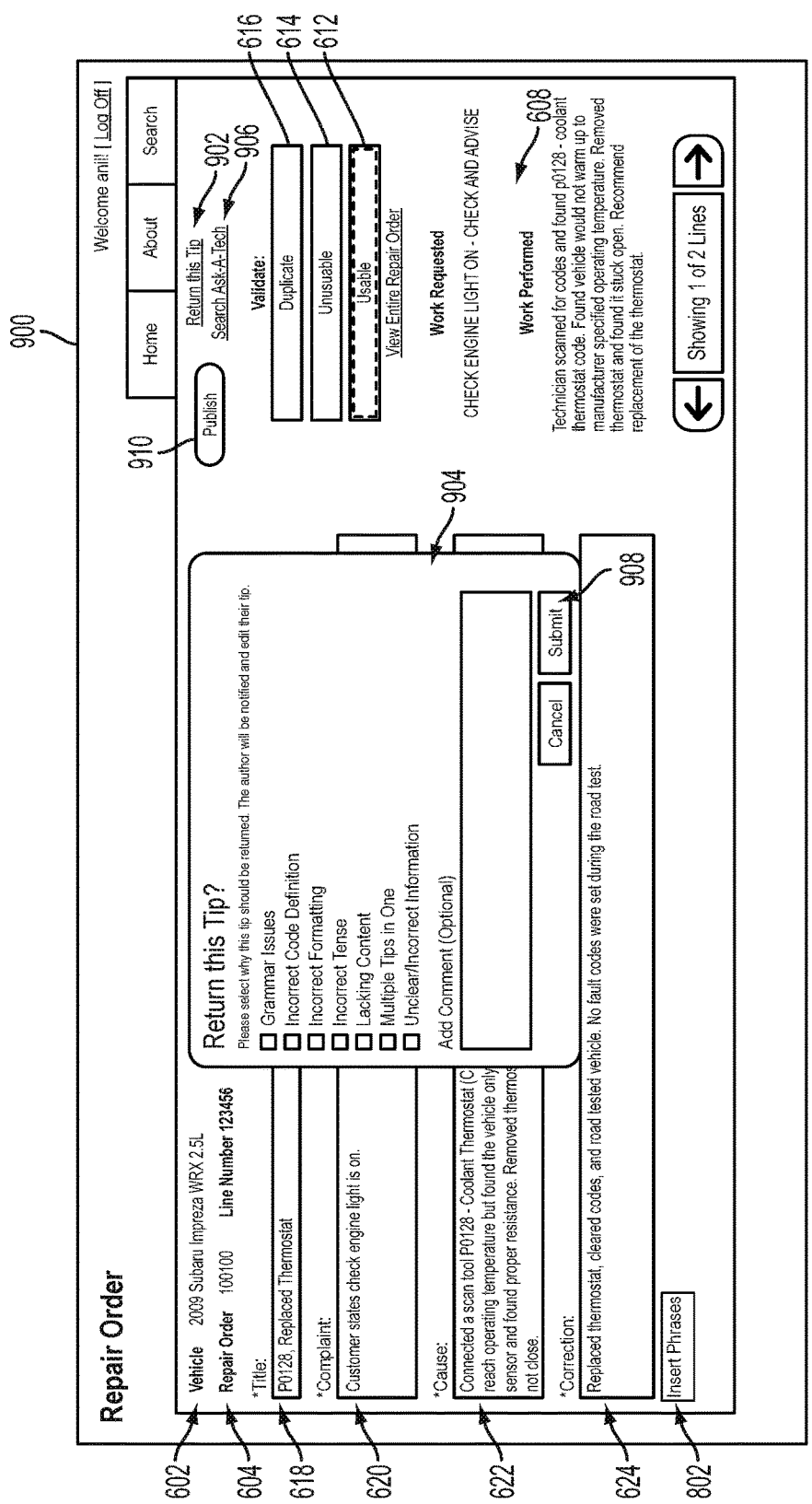
FIG. 9 shows another graphical user interface in accordance with one or more example embodiments.

Next, FIG. 9 shows an example QC GUI 900 in accordance with one or more example embodiments described herein. QC GUI 900 can be used for reviewing real-fix tips prior to the tips being published for presentation to RO receiver 114. QC GUI 900 is not so limited though as it could be configured for reviewing real-fix tips after publication. A coordinator can be a person other than the person that generated the real-fix tip using system 100. QC GUI 900 can display the fields of text entry area 610 and the text entered into the fields.

QC GUI 900 can include one or more of the validation selections, such as usable RO selection 612, non-usable RO selection 614, and duplicate RO selection 616. Selecting usable RO selection 612 for a real-fix tip displayed by QC GUI 900 can cause processor 202 to associate that real-fix tip with the subject RO or a group of RO including the subject RO. In accordance with one or more example embodiments, a real-fix tip that has been selected, using QC GUI 900, as a usable RO can be classified as a published real-fix tip. Published real-fix tips can comprise real-fix tips that are presentable to RO receiver 114.

In addition to publishing the real-fix tip, the subject RO and any duplicate RO of the subject RO can be published along with the real-fix tip. For instance, if a real-fix tip is published for RO group 310, the real-fix tip and each RO of RO group 310 can be published concurrently with the real-fix tip.

Selecting non-usable RO selection 614 for a real-fix tip displayed by QC GUI 900 can cause a reviewer comment area 904 to become active. As shown in FIG. 9, reviewer comment area 904 can be within a pop-up window overlaid over a portion of QC GUI 900. Reviewer comment area 904 is shown to have selectable pre-authored reasons why the real-fix tip should be returned for revising the real-fix tip. Spontaneous reasons can be entered using an Add Comment area of reviewer comment area 904. Reasons other than the reasons shown in FIG. 9 or the Add Comment area can be included to input reasons why the real-fix tip should be returned for revisions. Upon entering one or more reasons for returning a real-fix tip prior to publication, a submit selector 908 can be selected to submit the reasons and to cause the subject RO or a group of RO including the subject RO to be returned to a person that generated the real-fix tip along with a request to revise the real-fix tip or to another fix-generator.

Fix-generator DPM 108 can generate, for display using display device 214, a real-fix tip revision GUI (not shown) that identifies real-fix tips that have been returned from a coordinator using QC GUI 900. The real-fix tip revision GUI can display the reasons why the real-fix tip was returned by a QC coordinator and text entry areas for revising the real-fix tip. The real-fix tip revision GUI can include a selector to re-submit the real-fix tip for review using QC GUI 900.

Selecting duplicate RO selection 616 for a real-fix tip displayed by QC GUI 900 can cause the real-fix tip to be flagged as a real-fix tip to be compared to another RO associated with a real-fix tip. In use, a coordinator (e.g., a reviewer) of the displayed real-fix tip can suspect that a real-fix tip has already been generated for another RO having data similar to the data in text entry area 610 for the displayed real-fix tip and a similar repairable item. QC GUI 900 can include a search selector 906 to search for, among other things in RO database 106, previously-entered real-fix tips. The search selector 906 can be referred to as a "Search Ask-a-Tech" selector, but is not so limited. In accordance with one or more of the example embodiments, fix-generator DPM 108 can be configured to present a selector that allows a user to select the previously-generated real-fix tip or the duplicate real-fix tip as a tip to use for the subject RO and other RO duplicates of the subject RO.

GUI 900 can include a publish selector 910 for entering a selection to publish the real-fix tip. Publish selector 910 can cause the real-fix tip to be stored in RO database 106 as a published real-fix tip, or data indicating the real-fix tip is a published real-fix tip.

III. Example Operation

A. Fix-Generator DPM Functions

In addition to the functions described thus far as being performed by a fix-generator DPM, fix-generator DPM 108 can perform one or more of the following functions described in this section of the description. Since fix-generator DPM 108 can be arranged like DPM 200, elements of DPM 200 are discussed with regard to fix-generator DPM 108 performing those functions. Processor 202 executing CRPI 212 can receive selections or other data input by the fix-generator and carry out functions in response to receiving the selections or other data.

Fix-generator DPM 108 can present a logon GUI that allows the fix-generator to enter data for logging onto RO database 106. RO database 106 can comprise account data that can be compared to data entered using fix-generator DPM 108 to ensure that the fix-generator using fix-generator DPM 108 has permission to access RO database 106.

Fix-generator DPM 108 can browse attachments to identify an attachment to be associated with a real-fix tip, select an identified attachment, and attach the selected attachment so as to associate the selected attachment with the real-fix tip. The attachments can be stored in RO database 106, fix-generator DPM 108, or in another data storage device. As an example, a selected attachment can include an image of a vehicle component, a schematic diagram of electrical circuitry, or some other attachment. A coordinator reviewing the real-fix tip using coordinator DPM 110 can view the attachment to confine the attachment is appropriate for attaching to the real-fix tip prior to publishing the real-fix tip. Fix-generator DPM 108 or coordinator DPM 110 can remove an attachment associated with a real-fix tip.

Figure 14:
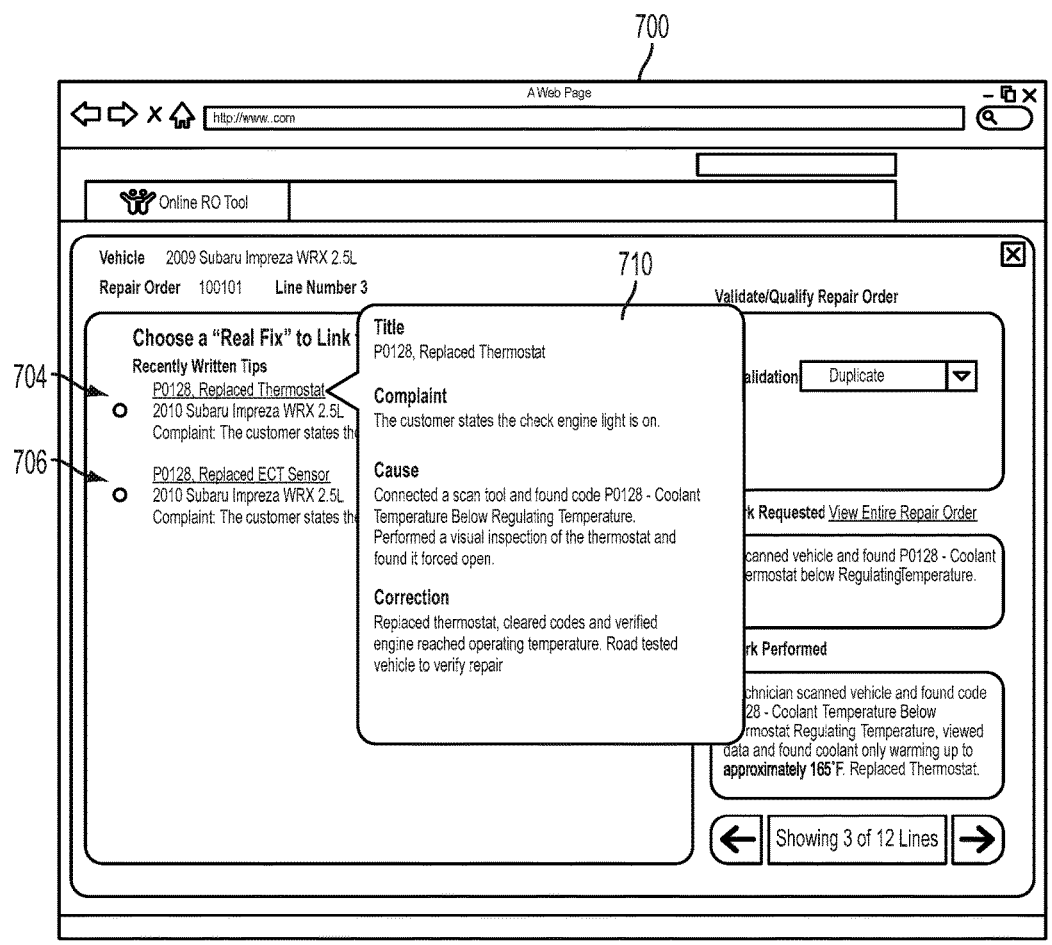
FIG. 14 shows another graphical user interface in accordance with one or more example embodiments.

Fix-generator DPM 108 can produce a hover view to display a previously-entered real-fix tip. FIG. 14 shows a hover view 710 for GUI 700. Selector 216 can control an element pointer, such as a mouse pointer displayed on a GUI, to cause display device 214 to display the hover view. As an example, a pointer (not shown) displayed on GUI 700 can be moved into close proximity to a title of a selectable real-fix tip 704. When the pointer is within a threshold distance of any portion of the title, a hover view showing the real-fix tip in its entirety can appear so that the fix-generator can read the real-fix tip without closing GUI 700 or changing to another GUI. When the pointer is moved beyond the threshold distance away from the title while the hover view is displaying the real-fix tip, the hover view can close so that the real-fix tip is no longer presented within a hover view.

B. Coordinator DPM Functions

In addition to other functions described thus far as being performed by a coordinator DPM, coordinator DPM 110 can perform one or more of the following functions described in this section of the description. Since coordinator DPM 110 can be arranged like DPM 200, elements of DPM 200 are discussed with regard to coordinator DPM 110 performing those functions. Processor 202 executing CRPI 212 can receive selections or other data input by the coordinator and carry out functions in response to receiving the selections or other data. Coordinator DPM 110 can be configured to perform any function that fix-generator DPM 108 can perform.

Coordinator DPM 110 can present a logon GUI that allows the coordinator to enter data for logging onto RO database 106. RO database 106 can comprise account data that can be compared to data entered using coordinator DPM 110 to ensure that the coordinator using DPM coordinator DPM 110 has permission to access RO database 106.

Coordinator DPM 110 can be used to navigate RO database 106 to select real-fix tips awaiting publication. That navigation can occur, e.g., using GUI 500.

Coordinator DPM 110 can display a list of real-fix tips, reviewable by the coordinator, and receive a selection of a real-fix tip being displayed. As an example, coordinator DPM 110 can display the list of real-fix tips using GUI 600 or another GUI. The list can include a title of the real-fix tip and a time stamp that indicates, e.g., a date and time that the real-fix tip was submitted for publication or approved for publication. The real-fix tips in the list can be sorted by, e.g., a vehicle name (most recent year first), then by symptom, and then by real-fix tip title. Other examples of criteria for sorting real-fix tips are also possible. As another example, the coordinator can enter the real-fix tip selection using an input device, such as a mouse or touch screen, of coordinator DPM 110. Selecting a displayed real-fix tip can occur using GUI 600 or another GUI.

Coordinator DPM 110 can receive a selection of a real-fix tip from GUI 600 or another GUI. The coordinator can enter that selection using selector 216.

Coordinator DPM 110 can display the real-fix tip, selected by the coordinator, and text of an RO. Coordinator DPM 110 can present QC GUI 900 to return a real-fix tip to a fix-generator and to publish a real-fix tip for presentation at RO receiver 114. QC GUI 900 can prompt the coordinator to add notes and to receive notes entered by the coordinator. QC GUI 900 can prompt the coordinator to confirm submission of entered notes and a request to return the real-fix tip to the fix-generator for editing. QC GUI 900 can receive a selection to confirm submission of the entered notes and request to return the real-fix tip. QC GUI 900 can also receive a selection to cancel entering the notes or returning the real-fix tip. Coordinator DPM 110 can further be arranged to present a GUI, such as QC GUI 900, to create or edit a real-fix tip.

C. Additional System Operation

Figure 10:
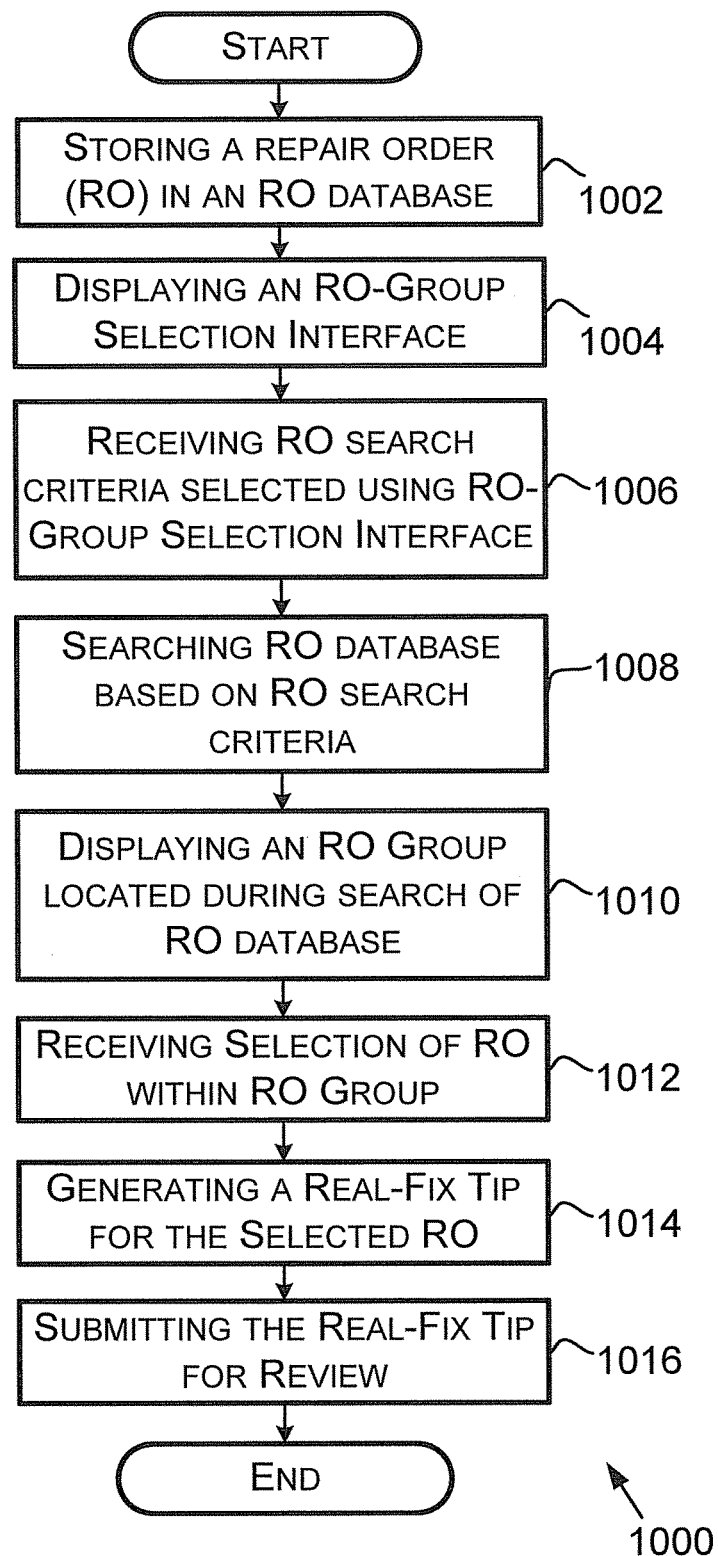
FIG. 10 is a flowchart depicting functions that can be carried out in accordance with one or more example embodiments.

Next, FIG. 10 is a flowchart depicting a set of functions 1000 (or more simply "the set 1000") that can be carried out in accordance with one or more example embodiments described herein. The set 1000 includes the functions shown in blocks labeled with even numbers 1002 through 1016, inclusive. One or more functions of the set 1000 can be carried out using RO collector DPM 104, RO database 106, fix-generator DPM 108, coordinator DPM 110, or RO distributor DPM 112.

Block 1002 includes storing an RO (e.g., one or more RO) in RO database 106. Storing the RO can comprise storing multiple RO received from RO provider 102 (e.g., one or more RO providers). RO collector DPM 104 can receive the RO via network link 150 and provide the RO to RO database 106 via network link 151. RO database 106 can store the RO in an area of RO database 106 designated for un-mapped RO (see FIG. 19). RO database 106 can store data that indicates whether or not the RO is published (see description of Field T below). RO distributor DPM 112 or RO database 106 can prevent RO receiver 114 from accessing unpublished RO stored within RO database 106. Fix-generator DPM 108 or coordinator DPM 110 can cause RO database 106 to store an RO revised by fix-generator DPM 108 or coordinator DPM 110, respectively.

Next, block 1004 includes displaying an RO-Group Selection Interface. Processor 202 can execute GUI CRPI 304 to display GUI 1200. Display device 212 can display the GUI 1200. Displaying the RO-Group Selection Interface can include execution of DPM CRPI 316.

Next, block 1006 includes receiving RO search criteria selected using the RO-Group selection interface. Processor 202 can execute GUI CRPI 304 to receive a selection of search criteria via GUI 1200. Receiving the RO search criteria can include execution of DPM CRPI 316.

Next, block 1008 includes searching the RO database 106 based on the RO search criteria. Processor 202 can execute GUI CRPI 302 to search RO database 106. Searching the RO database 106 can include execution of DPM CRPI 316.

Next, block 1010 includes displaying an RO group located during the search of the RO database 106. Display device 214 can display the RO group. Processor 202 can execute GUI CRPI 304 or DPM CRPI 316 to generate a GUI, such as GUI 500, to display the RO group. Displaying the RO group can include execution of DPM CRPI 316.

Next, block 1012 includes receiving selection of RO within the RO group. Processor 202 can execute RO-selection CRPI 306 to receive selection of the RO based on a selection made using selector 216. That selection can occur using GUI 500. Receiving selection of the RO can include execution of DPM CRPI 316.

Next, block 1014 includes generating a real-fix tip for the selected RO. Processor 202 can execute GUI CRPI 304 to generate a GUI, such as GUI 600, to display a real-fix creation interface, and to generate a GUI, such as GUI 800, to display insert phrases area 804 for inserting standard phrases into text entry area 610. Processor 202 can execute tip-generation CRPI 308 to receive selections of standard phrases entered via GUI 800 or an attachment entered via attachment selector 626. Generating the real-fix tip can include execution of DPM CRPI 316 and phrase selection CRPI 322.

Next, block 1016 includes submitting the real-fix tip for review. Processor 202 can execute GUI CRPI 204 to display GUI 600 to display usable RO selection 612 and to receive a selection of usable RO selection 612 to indicate that text entered using text-entry area 610 is being submitted as a real-fix tip for review. In an alternative embodiment, submitting the real-fix tip generated for one RO among an RO group can occur by validating each RO of the RO group with a selection from validation selection area 606.

Figure 11:
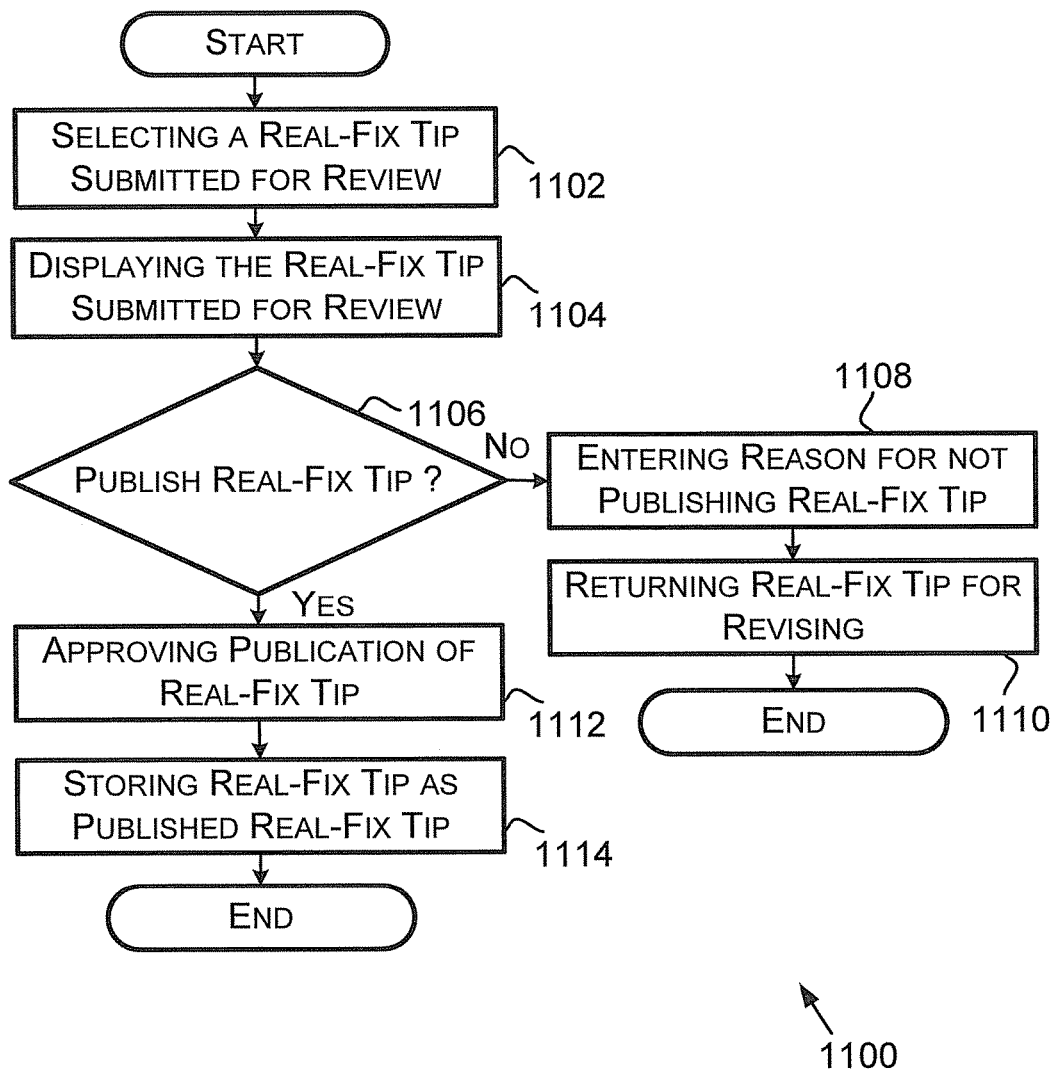
FIG. 11 is another flowchart depicting functions that can be carried out in accordance with one or more example embodiments.

Next, FIG. 11 is a flowchart depicting a set of functions 1100 (or more simply "the set 1100") that can be carried out in accordance with one or more example embodiments described herein. The set 1100 includes the functions shown in blocks labeled with even numbers 1102 through 1114, inclusive. One or more functions of the set 1100 can be carried out using coordinator DPM 110.

Block 1102 includes selecting a real-fix tip submitted for review. Selecting the real-fix tip can comprise selecting an RO group from a GUI that lists one or more RO groups. The list can include RO groups for which real-fix tips have been generated, but are not yet published. Alternatively, the list can include one or more other types of RO groups. The RO group on the list can include text or symbols that indicate a status of a real-fix tip for that RO group. For example, the status can indicate "No Real Fix Tip" if no real-fix tip has been generated for the RO group, "Real Fix Tip Awaiting Publication" if a real-fix tip has been written for the group, but has not yet been published, or "1 Existing Real Fix" if a real-fix tip has been published for the RO group. RO group 510 in FIG. 5 shows an example of that latter status indicator. Other examples of selecting a real-fix tip are also possible. In accordance with that example, selecting the real-fix tip can occur by selecting the RO group having the status "Real Fix Tip Awaiting Publication."

Next, block 1104 includes displaying the real-fix tip submitted for publication. Displaying the real-fix tip can include displaying text entry area 610 or the text entered using text entry area 610. Displaying the real-fix tip can occur using a GUI, such as GUI 900. Display device 214 can display the real-fix tip selected for review prior to publication.

Next, block 1106 includes making a determination whether to publish the real-fix tip. The determination of block 1106 can be based on whether the real-fix tip meets criteria established by an entity operating system 100, but the determination is not so limited. As an example, the criteria or at least a part of the criteria can be that appropriate text has been entered into each text entry box 618 through 624. Other examples of the criteria are also possible.

If the determination of block 1106 is that the real-fix tip should not be published, a process based on the set 1100 can continue at block 1108. Block 1108 includes entering a reason for not publishing the real-fix tip. Reviewer comment area 904 can appear as part of GUI 900 in response to selection of tip-return selector 902. A coordinator can enter one or more reasons why the real-fix tip is being returned using text entry area 904. Processor 202 can determine that the real-fix tip is ready to be returned to the fix-generator, along with a reason for returning the real-fix tip for revision, by receiving a selection of submit selector 908.

Block 1110 includes returning the real-fix tip for revising. Fix-generator DPM 108 can display a GUI that identifies one or more real-fix tips that have been returned prior to publication. Fix-generator DPM 108 can receive a selection of a returned real-fix tip and display the returned real-fix tip via a GUI showing text-entry areas 618 through 624 and a coordinator-note area (not shown) that indicates the reasons, entered via reviewer comment area 904, why the real-fix tip was returned prior to publication. After reviewing the returned real-fix tip, fix-generator DPM 108 can receive a selection from validation selection area 606. For instance, if the real-fix tip is revised, usable RO selection 612 can be selected to cause the revised real-fix tip to be submitted for review (see block 1016). Alternatively, if revising the real-fix tip will not occur, duplicate RO selection 616 could be selected if a real-fix tip has been or will be generated for another RO, or non-usable RO selection 614 could be selected if the RO associated with the real-fix tip is not to be presented to RO receiver 114.

Returning to block 1106, if the determination of block 1106 is that the real-fix tip should be published, a process based on the set 1100 can continue at block 1112. Block 1112 includes approving publication of the real-fix tip. Processor 202 can determine the real-fix tip has been approved for publication by receiving a selection of publish selector 910.

Block 1114 includes storing real-fix tip as a published real-fix tip. RO database 106 can receive, from coordinator DPM 110, data that indicates the real-fix tip is or can be published. RO database 106 can store that data regarding the real-fix tip such that the real-fix tip is published in a data record field, such as Field T. Afterwards, RO distributor DPM 112 can provide the published real-fix tip to RO receiver 114.

This description describes several example GUI having various selectors and text entry areas. A person having ordinary skill in the art will understand that one or more of the selectors or text entry areas can be shown on a GUI or pop-up window that is separate and distinct from the example GUI. Furthermore, the person having ordinary skill in the art will further understand that using the example GUI can include displaying popup windows that allow a user, such as a coordinator or a fix-generator, to confine submission of a selection or text or to enter a cancel selection so that the selection or text entered using a selector or text entry area is not submitted.

IV. RO Pre-Mapping

One or more of the example embodiments described herein can include elements or functions pertaining to pre-mapping of RO. Pre-mapping an RO can include a processor executing RO mapping CRPI 320 to compare text or symbols of a computer-readable RO stored in RO database 106 to mapping terms, standard terms, context terms, or data record fields and to generate a searchable database record associated with the RO. Pre-mapping an RO can include generating a mapped RO that includes standard terms or phrases in place of non-standard terms or phrases that are part of the un-mapped RO. After pre-mapping RO, data records generated during the pre-mapping can be searched to locate RO within RO database 106 instead of searching the RO themselves.

FIG. 18 shows an example RO 180. RO 180 can be generated by RO provider 102 and provided to RO collector DPM 104 as a non-computer-readable RO (e.g., a paper RO) or as a computer-readable RO storable in a computer-readable data storage device, such as RO database 106. The computer-readable RO can be arranged as a structured query language (SQL) file. Alternatively, the computer-readable RO can be arranged as an extensible markup language (XML) file. An original computer-readable RO provided by RO provider 102 is an un-mapped RO. Similarly, an original computer-readable RO generated by RO collector DPM 104 prior to any pre-mapping of that RO is also an un-mapped RO.

RO 180 includes a service provider identifier 181, a date of service identifier 182, a customer indicator 183 that indicates a customer seeking service of a given vehicle, vehicle information 184 that indicates the given vehicle, a service request 185 indicating the complaint or service requested by the customer, parts information 186 indicating parts obtained for servicing the given vehicle, and service procedure information 187, 188, and 189 carried out on the given vehicle.

Service provider identifier 181 can include, e.g., information that indicates a name and geographic location of the service provider. Vehicle information 184 can include a vehicle identification number (VIN) associated with the given vehicle and a description of the given vehicle. Service procedure information 187, 188, and 189 can include information within distinct sections 190, 191, and 192, respectively, of RO 180. The service procedure information within any one distinct section 190, 191, and 192 can be unrelated to the service procedure information with any other distinct section. Alternatively, two or more distinct sections including service procedure information can pertain to related service operations performed on the given vehicle.

Some RO stored within RO database 106 can be arranged in a configuration that differs from RO 180. Nevertheless, the RO arranged in another configuration typically includes at least one of the types of information described above as being a part of RO 180.

The RO stored within RO database 106 can comprise searchable text or symbols (e.g., text, symbols, or text and symbols). As an example, a symbol on an RO can comprise an empty check box or a checkbox and a checkmark inside the checkbox.

Multiple portions of text on a RO can be grouped as phrases. When comparing contents of an RO to various teens, such as mapping terms, standard terms, or context terms, words within a given proximity to one or more other words can be grouped as a phrase to be compared to the mapping, standard, or context terms. The given proximity can, e.g., be within X words, where X equals 1, 2, 3, 4, 5, or some other number of words. As an example, service procedure information 187 states "Check starter/ignition system." The words "Check" and "ignition system" are within 3 words of one another. In accordance with an embodiment in which the given proximity is greater than 1 word, the words "Check" and "ignition system" can be grouped as the phrase "Check ignition system" for comparison to mapping, standard, or context terms.

RO 180 includes labor operation codes (LOC). The labor operation codes can conform to those defined by a vehicle manufacturer, a service provider that generates an RO, a service information provider, such as Mitchell Repair Information, LLC, Poway, Calif., or some other entity. For simplicity of FIG. 18, the labor operation codes are shown within parenthesis, such as (C45) and (C117). Each LOC can refer to a particular operation performed to the given vehicle. A DPM within system 100 can use a LOC to determine what type of operation was performed to the given vehicle if other information regarding that operation is incomplete or described using non-standard phrases or terms. A DPM can also use LOC to determine context for a service line of the RO.

Figure 19:
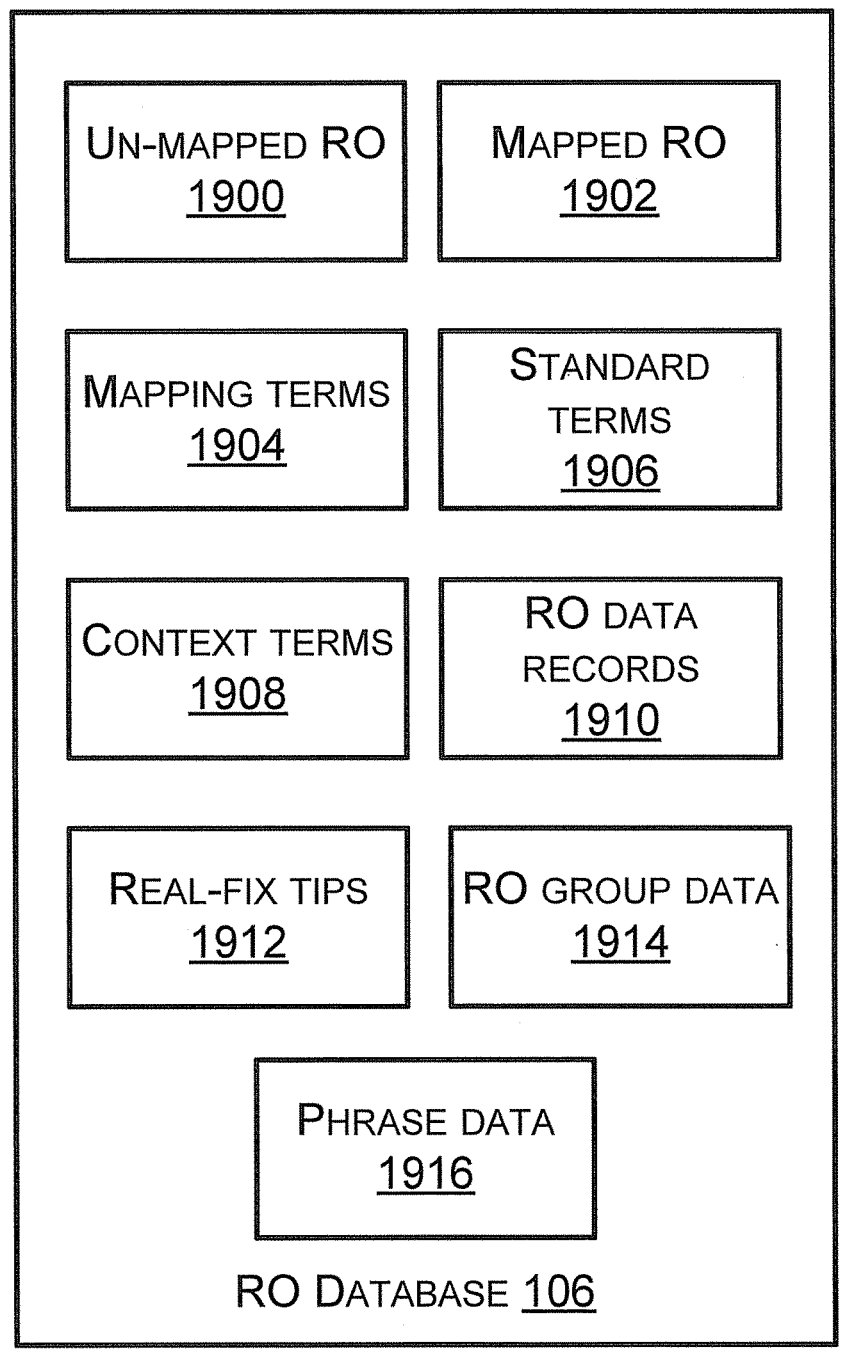
FIG. 19 is a block diagram of an RO database in accordance with one or more example embodiments.

FIG. 19 shows additional details of RO database 106 in accordance with one or more example embodiments. As shown in FIG. 19, RO database 106 includes un-mapped RO 1900, mapped RO 1902, mapping terms 1904, standard terms 1906, context terms 1908, RO data records 1910, real-fix tips 1912, RO group data 1914, and phrase data 1916. In alternative arrangements, mapping terms 1904, standard terms 1906, context terms 1908, RO data records 1910, real-fix tips 1912, RO group data 1914, or phrase data 1916 can be stored within a data storage device other than the data storage device storing RO database 106. Real-fix tips 1912 can include unpublished real-fix tips and published real-fix tips.

Un-mapped RO 1900 comprises original computer-readable RO received from RO provider 102 or original computer-readable RO generated from a non-computer-readable RO received from RO provider 102. In accordance with one or more of the example embodiments, the RO provided to RO receiver 114, fix-generator DPM 108 or coordinator DPM 110 can be limited to RO from un-mapped RO 1900. In accordance with one or more other example embodiments, the RO provided to RO receiver 114, fix-generator DPM 108 or coordinator DPM 110 can be limited to RO from mapped RO 1902. In accordance with yet one or more other example embodiments, the RO provided to RO receiver 114, fix-generator DPM 108 or coordinator DPM 110 can be RO from un-mapped RO 1900 and RO from mapped RO 1902. A DPM shown in FIG. 1, or another DPM, can execute CRPI to pre-map un-mapped RO within un-mapped RO 1900 into mapped RO for storage as part of mapped RO 1902.

Mapped RO 1902 comprises RO generated from an un-mapped RO. A mapped RO can be arranged like an un-mapped RO, although any non-standard terms identified on the un-mapped RO are replaced with standard terms from within standard terms 1906. Furthermore, if the un-mapped RO is incomplete in any respect, such as the un-mapped RO does not include the model year of the vehicle referred to on the RO, a processor can determine data to complete incomplete portions of the un-mapped RO. For example, if RO 180 did not recite the model year 2012, the processor can determine the model year from the YIN recited on RO 180.

In response to RO distributor DPM 112 receiving, from RO receiver 114, a request for an RO, RO distributor DPM 112 can retrieve from RO database 106 and provide to RO receiver 114 a mapped RO with standard terms from RO database 106. Alternatively, RO distributor DPM 112 can retrieve from RO database 106 and provide to RO receiver 114 an un-mapped RO from RO database 106. RO receiver 114 can offer to a user a selection of whether to receive a mapped RO or an un-mapped RO.

Mapping terms 1904 can comprise terms that can be entered into a data record field. Mapping terms 1904 can also comprise data that identifies which data record each mapping term can be entered. Additionally or alternatively, the arrangement of mapping terms 1904 can define which data record each mapping term can be entered.

As an example, mapping terms 1904 can comprise terms that can be entered into a model year field of a data record (see, e.g., Field C of FIG. 20). The model year terms can be a predefined set of years, such as the years 1980 through 2013. As each new model year of vehicles is introduced, the predefined set of model years can be modified to include the new model year. Similarly, the predefined set of model years can be modified to include model years earlier than the earliest model year currently in the set of model years.

As another example, mapping terms 1904 can comprise terms that can be entered into a location field of a data record (see, e.g., Field M of FIG. 20). The location terms can be a predefined set of locations, such as locations where RO providers 102 are located. As additional RO providers 102 begin providing RO to RO collector DPM 104, the predefined set of locations can be modified to include locations of the additional RO providers 102 if those locations are not currently within the set of locations.

A mapping term within a predefined set of mapping terms can be added as a result of that mapping term being on an RO. For example, an un-mapped RO can include data indicating city: Madison, state: Wisconsin, and zip code: 53562. While searching contents of that un-mapped RO, RO collector DPM 104 can identify the city, state, and zip code data on the RO and determine that mapping terms 1904 does not include the identified city, state, and zip code data on the RO and modify mapping terms 1904 to include data, representing the identified city, state, or zip code, that can be entered into the location field of a data record. Fix-generator DPM 108 or coordinator DPM 110 can be configured to approve modifying mapping terms 1904 with new mapping terms.

At least some of mapping terms 1904 can be identical to (e.g., match) filter criteria selectable via an example GUI described herein. For example, mapping terms 1904 can include model year terms for the years between and including 1990 to 2012. As shown in FIG. 12, model year selectors 1220 on GUI 1200 includes selectors for model years 1990 through 2012. In this way, after selecting model years 1990 through 2012, as shown on FIG. 12, the RO mapped to a model year between 1990 through 2012 can be identified as an RO that matches the selected filter criteria. If no other filter criteria is selected, the RO that matches the selected filter criteria based on model year are the RO on which a response to the search requester is provided. If other filter criteria have been selected, the response to the search requester will be based on the RO data records with data that matches the selected filter criteria.

Standard terms 1906 can comprise standard terms to use on a mapped RO instead of a non-standard term on an un-mapped RO. Table 2 includes example standard terms (ST) and non-standard terms (NST) associated with the standard terms. As shown in Table 2, a standard term can be (i) a diagnostic trouble code identifier, such as DTC P0117 or DTC P0101, (ii) a labor operation, such as check battery or remove and replace, and (iii) component names, such as ignition switch, service engine soon light, coolant temperature sensor, and oxygen sensor. The other terms in each row of Table 2 including an ST are NST.

TABLE 2

| ST | NST | NST | NST | NST | NST |
|---|---|---|---|---|---|
| DTC P0117 | Code 117 | Code 0117 | DTC 117 | DTC P117 | P0117 |
| Check battery | Test battery | Measure battery | Measure battery volts | Check battery acid | (C45) |
| Remove and Replace | R/R | R & R | R and R | Remove and install | Swap |
| Ignition Switch | Starter Switch | Ign. Sw. | Ign. Switch | Starter Sw. | Start switch |
| Service Engine Soon Light | SES Light | Check Engine Light | Emissions Light | SES Bulb | SES Lamp |

TABLE 2-continued

| ST | NST | NST | NST | NST | NST |
|---|---|---|---|---|---|
| Coolant Temperature Sensor | ECT sensor | Coolant Sensor | Coolant Temp. Sensor | Radiator Temperature Sensor | Eng. Coolant Temp. Sen. |
| Oxygen Sensor | O2 sensor | O2 senser | O2 sensor | Oxy. sensor | O2 sens. |
| DTC P0101 | Code 101 | Code 0101 | DTC 101 | DTC P101 | P0101 |
| MAF Sensor | Mass air flow sensor | Air flow sensor | MAF | Vane meter sensor | VAF sensor |

Although Table 2 shows five NST for each ST, standard terms 1906 can include another number of NST for each ST. Standard terms 1906 do not need to have the same number of NST for each ST. Standard terms 1906 can include ST and NST for other information on an RO, such as customer complaints, vehicle make information, vehicle model information, or other information on the RO. A NST can comprise a misspelled word such as "O2 sensor." A NST can comprise terms with a typographical error such as "O2 sensor" where "O2 sensor" was the intended term.

The RO provided to RO receiver 114 can be original un-mapped RO that include non-standard terms. Additionally or alternatively, the RO provide to RO receiver 114 can include mapped RO in which a non-standard term on an RO provided to RO receiver 114 was replaced with a standard term. System 100 can be used configured to allow a given RO receiver 114 to change a standard term for RO provided to the given RO receiver. Changing the standard term for the given RO receiver allows for use of different terms based on, e.g., geographical location or language.

As an example, users of an RO receiver in Boston, Mass. may refer to a switch that allows for starting a vehicle as a starter switch, whereas users of an RO receiver in San Jose, Calif. may refer to that same switch as an ignition switch. As another example, users of an RO receiver in Detroit, Mich. may want to use English-language standard terms, whereas users of an RO receiver in San Antonio, Tex. may want to use Spanish-language standard terms, and users in Montreal, Quebec may want to use French-language standard terms. RO database 106 can include versions of un-mapped RO or mapped RO and other content, such as standard terms, in multiple languages so that the RO provided to an RO receiver can be in a language desired by users of that RO receiver.

Context terms 1908 can comprise context terms to associate with an RO line based on contents of that RO line on the original RO. A context terms associated with an RO line can be stored within field H of a data record for that RO line. A processor of a DPM can execute CRPI to compare the content of the RO line to context hints within context terms 1908. If the processor finds a match between the contents of the RO line and a context hint, the processor can associate the context term associated with that context hint as a context term for the RO line. Table 3 includes example context terms and context hints. Other examples of the context terms and context hints are also possible. A context term can also be a context hint for that context term.

TABLE 3

| Context Term | Context Hint | Context Hint | Context Hint | Context Hint |
|---|---|---|---|---|
| Electrical | Open Circuit | Shorted Circuit | Grounded Circuit | Wire |
| Mechanical | Stuck | Rotate | Movement | Turn |
| Hydraulic | Fluid | Leak | Oil pressure | Dripping |

As described above, an RO line can be displayed at a DPM, such as a fix-generator DPM 108. While an RO line associated with a context term is being displayed by the fix-generator DPM 108, the fix-generator DPM 108 can display a prompt to confirm that the context term associated with the RO line is appropriate for the RO line. The fix-generator DPM 108 can be configured to prevent submitting the RO comprising the RO line associated with the context term until the context term is confirmed to be appropriate. Accordingly, the fix-generator DPM 108 can be arranged to include entering a selection of whether the context term is appropriate or is not appropriate. If a selection of context term is not appropriate is selected, fix-generator DPM 108 can provide a selector to change or remove the context term associated with the RO line. For example, if RO line 187 pertains to a mechanical problem with an ignition switch, but the context associated with RO line 187 is electrical, the fix-generator DPM 108 can change the context term from electrical to mechanical. If, while an RO line is being reviewed at fix-generator DPM 108, it is determined that no context term is appropriate for the RO line, fix-generator DPM 108 can un-associate the context term associated with RO line.

RO data records 1910 can comprise data for a plurality of data record fields. The data within those fields map an RO or a line for a distinct service procedure identified on an RO. The RO data records 1910 can be searched to identify RO or a line on an RO that matches filter criteria selected using a DPM. Searching the RO data records 1910 to identify RO within RO database 106 that match the selected filter criteria can be carried out more quickly than searching the unmapped RO 1900 or the mapped RO 1902 directly.

RO group data 1914 can include data for one or more RO groups stored within RO database 106. For each RO group, RO group data 1914 can include identifier of the RO or RO lines numbers belonging to that RO group. For each RO group, RO group data 1914 can include an identifier of a real-fix tip that is associated with the RO and RO lines numbers of that RO group.

Phrase data 1916 can comprise complete phrases or incomplete phrases for use in generating real fix tips. Processor 202 can select a phrase from phrase data 1916, based on RO terms on an RO, and include the selected phrase within a real-fix tip being generated for the RO. Processor 202 can complete incomplete phrases while generating the real-fix tip.

FIG. 20 illustrates example field names 211 and data records 213 and 215 that can be stored within RO database 106. Data records 213 and 215 can be stored as part of RO data records 1910. Field names 211 can be stored within mapping terms 1904 or within RO data records 1910. Data records 213 and 215 pertain to RO 180.

The letters A through N above the field names 211 are provided for reference to individual field contents within a data record. For example, field A of data record 213 is 100200. One or more fields within a data record can have a null value when no other data is available or when no other data has been written into that field. As an example, fields I and J of data record 213 are shown as including a null value. A null value within a data field can be changed to a non-null value. For instance, upon a real-fix tip being assigned to data record 213, field I of data record 213 can be changed from a null value to a real-fix tip identifier.

Field A is for RO identifiers. Field B is for line numbers assigned to lines of an RO. Field C is for a model year (or more simply, year) of a vehicle referred to on an RO. Field D is for the make (e.g., the manufacturer) of the vehicle referred to on an RO. Field E is for the model name of the vehicle referred to on an RO. Field F is for engine identifiers of an engine within the vehicle referred to on an RO. Field G is for system identifiers of a system within the vehicle referred to on an RO. Field H is for context identifiers. Field I is for real-fix tip identifiers. Field J is for diagnostic trouble code (DTC) identifiers. Field K is for component identifiers. Field L is for service date identifiers. Field M is for location identifiers, such as a location identifier that identifies where the vehicle referenced on the RO was serviced. Although FIG. 20 shows the data within Field M is a city name and state abbreviation for a state within the United States, other data, such as a zip code or GPS location, can be used instead of or in combination with a city and state abbreviation. Field N is for Labor Operation Code (LOC) identifiers.

One or more of the data fields shown in FIG. 20 may not be included within a data record for one or more of the example embodiments. Moreover, a data record in accordance with the example embodiments can include other fields than the fields shown in FIG. 20.

For example, a data record can include a Field O for recording data that identifies a technician that performed service operations described on an RO. The technician identifier can be a pseudonym for the technician. The data for recording within a technician identifier field can be identified while contents of an RO are searched. An RO receiver 114 can submit a query based at least in part on a particular technician identifier if a person operating RO receiver 114 perceives that comments on an RO performed by the particular technician are more reliable or helpful than comments from another technician.

As another example, a data record can include a Field P for recording data that indicates whether or not the RO associated with the data record is a duplicate RO.

As another example, a data record can include a Field Q for recording data that indicates whether the RO has been classified to be within an RO group. Field Q can include data that identifies the RO group(s) to which the RO belongs.

As another example, a data record can include a Field R for recording data that indicates a quantity of characters or words for a line on the RO to which the data record is associated. For a group of RO being considered for writing a real-fix tip, the RO line having the greatest quantity of characters or words can be ranked as being most appropriate for generating the real-fix tip.

As another example, a data record can include a Field S for recording data that indicates a validation selection selected for a line on the RO to which the data record is associated. If no validation selection has been selected for the line, Field S can be a null value. Otherwise, Field S can indicate (i) "Useable" if usable RO selection 612 was selected for the line, (ii) "Not Usable" if non-usable RO selection 614 was selected for the line, or (iii) "Duplicate" if duplication RO selection 616 was selected for the line.

As another example, a data record can include a Field T for recording data that indicates whether or not the RO, to which the data record is associated, is published for presentation to RO receiver 114. The data recorded in Field T can be changed when the status of the RO changes from published to un-published or from un-published to published.

Figure 21:
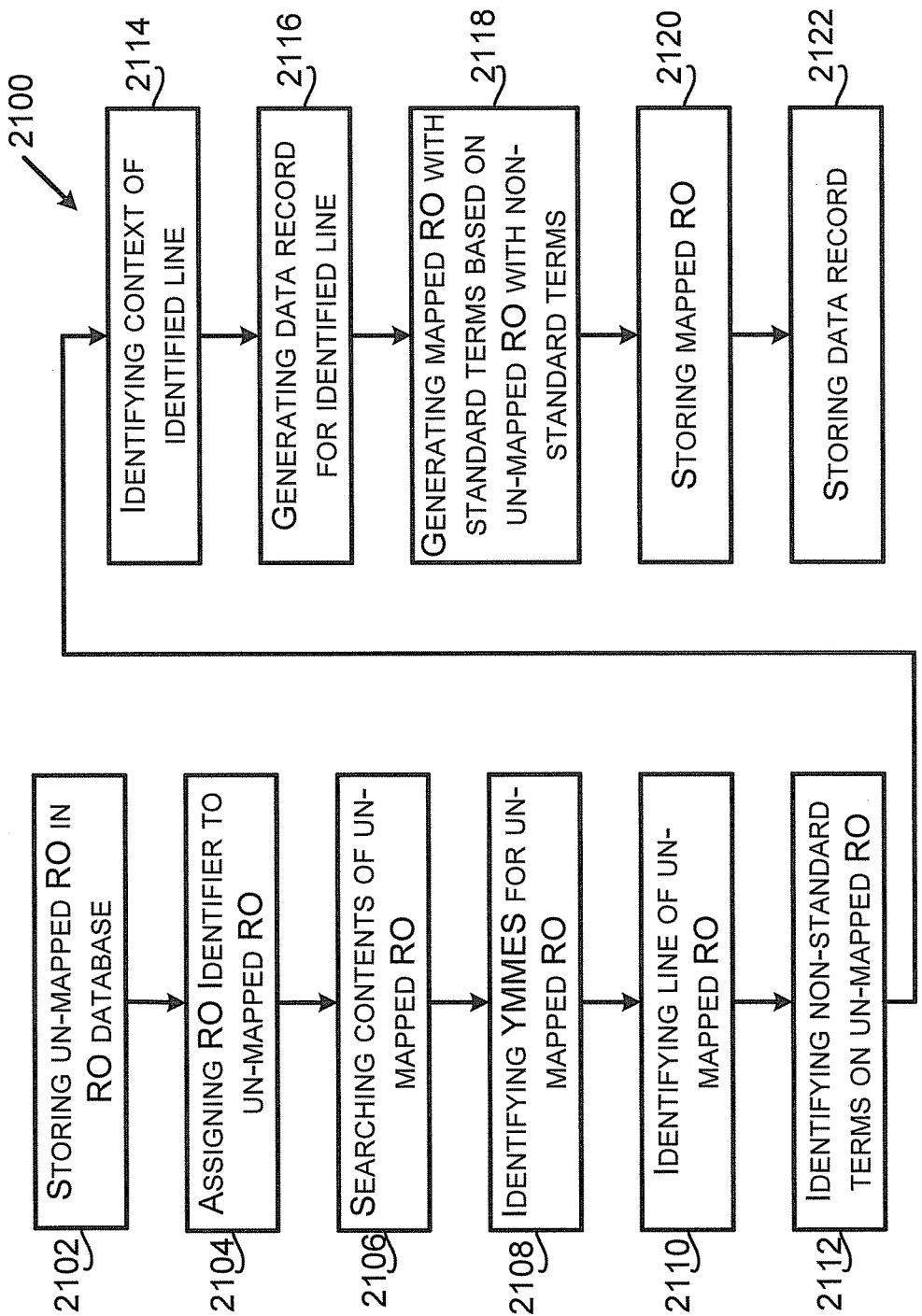
FIG. 21 is another flowchart depicting functions that can be carried out in accordance with one or more example embodiments.

FIG. 21 is a flowchart depicting a set of functions 2100 (or more simply "the set 2100") that can be carried out in accordance with one or more example embodiments described herein. The set 2100 includes the functions shown in blocks labeled with even numbers 2102 through 2122, inclusive. In accordance with one or more of the example embodiments, a processor of RO collector DPM 104 can execute CRPI to perform the set 2100. In accordance with one or more other example embodiments, another DPM in combination with RO collector DPM 104 can execute CRPI to perform the set 2100. Other examples of one or more DPM that can execute CRPI to perform the set 2100 are also possible.

Block 2102 includes storing un-mapped RO in RO database 106 as un-mapped RO 1900. The un-mapped RO can be generated by RO provider 102 and transmitted to RO collector DPM 104. The un-mapped RO stored in RO database 106 are computer-readable RO. The un-mapped RO stored in RO database 106 can comprise original RO generated by RO provider 102. The un-mapped RO stored in RO database 106 can also comprise original RO generated by RO collector DPM 104 by converting a non-computer-readable RO to a computer-readable RO. The un-mapped RO stored in RO database 106 can include ST, NST, or ST and NST defined within standard terms 1906. The un-mapped RO can be transmitted to RO collector DPM 104 alone or in combination with one or more other un-mapped RO. A processor 202 can execute CRPI 212 to cause the un-mapped RO received at or generated by RO collector DPM 104 to be stored as un-mapped RO 1900.

Next, block 2104 includes assigning an RO identifier to un-mapped RO. Typically, the RO identifier assigned to each RO within RO database 106 is unique (that is different from all other RO identifiers assigned to RO in the RO database 106). In any of the example embodiments, however, two or more RO stored in RO database 106 can be assigned a common RO identifier. For instance, an un-mapped RO stored within un-mapped RO 1900 and a mapped RO generated, from the un-mapped RO, with standard terms stored within mapped RO 1902 can be assigned a common RO identifier. Using the common RO identifier for those two RO can be one way to associate the un-mapped RO to the mapped RO generated from the un-mapped RO. An RO identifier can be an RO number, but is not so limited. For purposes of this description, a processor of RO collector DPM 104 can assign the RO identifier 100200 to RO 180.

Next, block 2106 includes searching contents of an un-mapped RO, such as RO 180. A processor of RO collector 104 or of another DPM can execute CRPI to transfer at least a portion of the un-mapped RO to the processor. Searching the contents of that portion of the un-mapped RO can comprise the processor comparing the transferred portion to mapping terms 1904, standard terms 1906, and context terms 1908. Various elements, as discussed with respect to blocks 2108, 2110, 2112, and 2114 below, can be identified while searching the contents of the un-mapped RO.

Next, block 2108 includes identifying YMMES for the un-mapped RO. In other words, block 2108 includes identifying the year/make/model/engine/system associated with a vehicle referred to on an RO. For RO 180, identifying YMMES can include identifying 2112 as the model year, General Motors as the manufacturer, Cadillac Escalade as the model, 6.2 Liter as the engine, and automatic transmission as the system. Identification of one or more of the values for YMMES, such as the manufacturer, can be identified from the VIN listed on RO 180. If one or more values of YMMES cannot be determined from RO 180, then that one or more values can be listed as a null value. If identification of more than one system per vehicle is desired, a data record can include more than one system field. Additionally or alternatively, the data in the system field of a data record can include a value that represents more than one system. Table 4 includes example values representing more than one system in a vehicle. The identified YMMES can be used when generating a data record for one or more lines identified on the unmapped RO.

TABLE 4

| Value for System Field "G" | Systems |
| --- | --- |
| 00 | Automatic Transmission and Air Conditioning |
| 01 | Manual Transmission and Air Conditioning |
| 10 | Automatic Transmission, No Air Conditioning |
| 11 | Manual Transmission, No Air Conditioning |

Next, block 2110 includes identifying a line of the un-mapped RO. The line or lines or the un-mapped RO each refer to a distinct service procedure referred to on the RO. In another respect, the lines of an RO can be classified as labor lines and parts lines. The labor lines refer to a service that was performed on a vehicle, such as a service performed at an hourly rate. The parts lines refer to service parts, such as part that were sold to a customer to complete a vehicle repair. A processor when generating the un-mapped RO can recognize a distinct section of the RO (see distinct sections 190, 191, 192) and identify the distinct section as a line of the RO. Any contents of the RO within the identified distinct section can be used to populate a data record generated for that line. Multiple RO lines can be considered multiple records that share a common RO number. Other examples of identifying a line of the un-mapped RO are also possible.

Although a processor can execute CRPI to identify a line or lines within an RO, a fix-generator using fix-generator DPM 108 or a coordinator using coordinator DPM 110 can review the identified line or lines to determine whether a given line should be split into two or more separate lines and to determine whether two or more lines on an RO should be merged into a single line. In that regard, fix-generator DPM 108 and coordinator DPM 110 can be configured to generate a new data record when splitting an identified line into two or more separate lines, and to merge two or more data records when merging two or more RO lines.

Next, block 2112 includes identifying non-standard terms on the un-mapped RO. Identifying the non-standard terms can include comparing the contents of the un-mapped RO to the NST of standard terms 1906. If any NST is identified, the ST associated with the identified NST can be determined from standard terms 1906. For example, while comparing the contents of RO 180 (in particular, service procedure information 187), a processor can identify that service procedure information 187 contains an NST (that is, "starter switch") and that the standard term for that NST is "ignition switch." As another example, while comparing the contents of service procedure 189, the processor can identify that service procedure information 189 contains an NST "R/R" and that the standard term for that NST is "Remove and Replace."

Next, block 2114 includes identifying context of the identified line. Identifying the context can include comparing contents of an identified line to context terms 1908. If any context hint of context terms 1908 is identified, the context term associated with the identified context can be determined from context terms 1908. For example, while comparing the contents of service procedure information 187, a processor can identify that service procedure information 187 contains a context hint (that is, "turn") and that the context term for that context hint is "Mechanical." The identified context term (or more simply context) for the identified line can be used when generating a data record for the identified line, as discussed with respect to block 2116.

Next, block 2116 includes generating a data record for an identified line. Generating the data record can include allocating a portion of RO data records 1910 for storing data for fields A through T, any combination of fields A through T, or some other combination of data fields of a new data record. The RO number assigned to the RO at block 2104 can be written into field A for the new data record. A line number can be written into field B for the new data record. The RO database 106 can assign the line number for writing into field B. As an example, the assigned line number can be equal to the line number most recently assigned to another RO line plus one. Fields C through G of the new data record can be filled with YMMES data determined at block 2108. Field H of the new data record can be filled with a context term determined at block 2114. Fields J through O and R of the new data record can be filled with data determined while searching contents of the un-mapped RO at block 2106. Field I of the new data record can be filled with a real-fix-tip identifier that is associated with the RO identified in Field A and the line number identified in Field B of the data record. Fields P, Q, S and T can be filled with data based on selections and data entry via a GUI of system 100.

Next, block 2118 includes generating a mapped RO with standard terms based on an un-mapped RO with non-standard terms. Generating the mapped RO can include modifying an un-mapped RO, such as RO 180, by replacing any NST on the RO with ST and adding any data missing from the un-mapped RO that can be determined from other data on the un-mapped RO.

Next, block 2120 includes storing the mapped RO. Storing the mapped RO can comprise storing the mapped RO within RO database 106 as part of mapped RO 1902.

Next, block 2122 includes storing the data record. The stored data record can include an RO identifier that is associated with the data record. Data records, such as data records 213 and 215, can be stored within RO database 106 as part of RO data records 1910. After storing an RO record, the RO data record can be modified and the modified data record can be stored in RO data records 1910 in place of the prior version of the data record.

V. Automatic Phrase Selection

One or more of the example embodiments described herein can include a processor executing CRPI 212 to select phrases for real-fix tips. FIG. 23 is a table 2300 showing example phrase data. Phrase data 1916 can be arranged like the example phrase data of table 2300, but phrase data 1916 is not so limited. For example, phrase data 1916 does not have to be stored in a table, but can be stored in some other configuration.

Table 2300 includes columns A through E and rows 0 through 8. Row 0 identifies types of data within columns A through E, namely RO terms in columns A, B, and C, phrases in column D, and real-fix tip (RFT) applicability in column E. RO terms in column A are DTC. RO terms in column B are component names of components within a vehicle. RO terms in column C are customer complaints. The identifier in row 1 of column C is "RO Term N," where N represents an integer. In that regard, more than 3 RO terms can be associated with a single phrase within phrase data 1916. Furthermore, more than 3 types of RO terms can be included within phrase data 1916. For example, another type of RO term can be labor operation codes.

As discussed with respect to FIG. 6, a real-fix tip can include a title field, a complaint field, a cause field, and correction field. The RFT applicability data for each row indicates which real-fix tip field the phrase of that row applies (e.g., can be used). For instance, the phrases of rows 1 and 2 of table 2300 can be used (e.g., inserted into) in the title field of a real-fix tip. Although each phrase of table 2300 is applicable to only one real-fix tip field, one or more other phrases (not shown) could be applicable to multiple real-fix tip fields.

The RO terms and RFT applicability of Table 2300 can be used to select a phrase for inserting into a real-fix tip regarding a service procedure on an RO. Processor 202 can execute phrase selection CRPI 322 to identify the RO terms within the service procedure described on the RO and find matching terms within phrase data 1916 to locate a phrase for populating into a field within a real-fix tip for the RO.

One or more phrases can include a portion that is based on RO terms listed on an RO and a portion that is based on assumptions regarding the RO. The phrase in row 3 can include a portion (e.g., "the car runs rough") that is based on an assumption. That assumption can be based on past experience of system users defining phrase data 1916 or from other ROs. As an example, when a vehicle has P0300 is set to a current state such that a customer would complain the check engine light is on, an assumption can be made that the vehicle (e.g., a car) runs rough. A real-fix tip field can be populated with a phrase having a portion based on an assumption. That real-fix tip can be reviewed during a QC review of the real-fix tip. If desired, the portion of the phrase based on assumption can be modified during the QC review.

Figure 22:
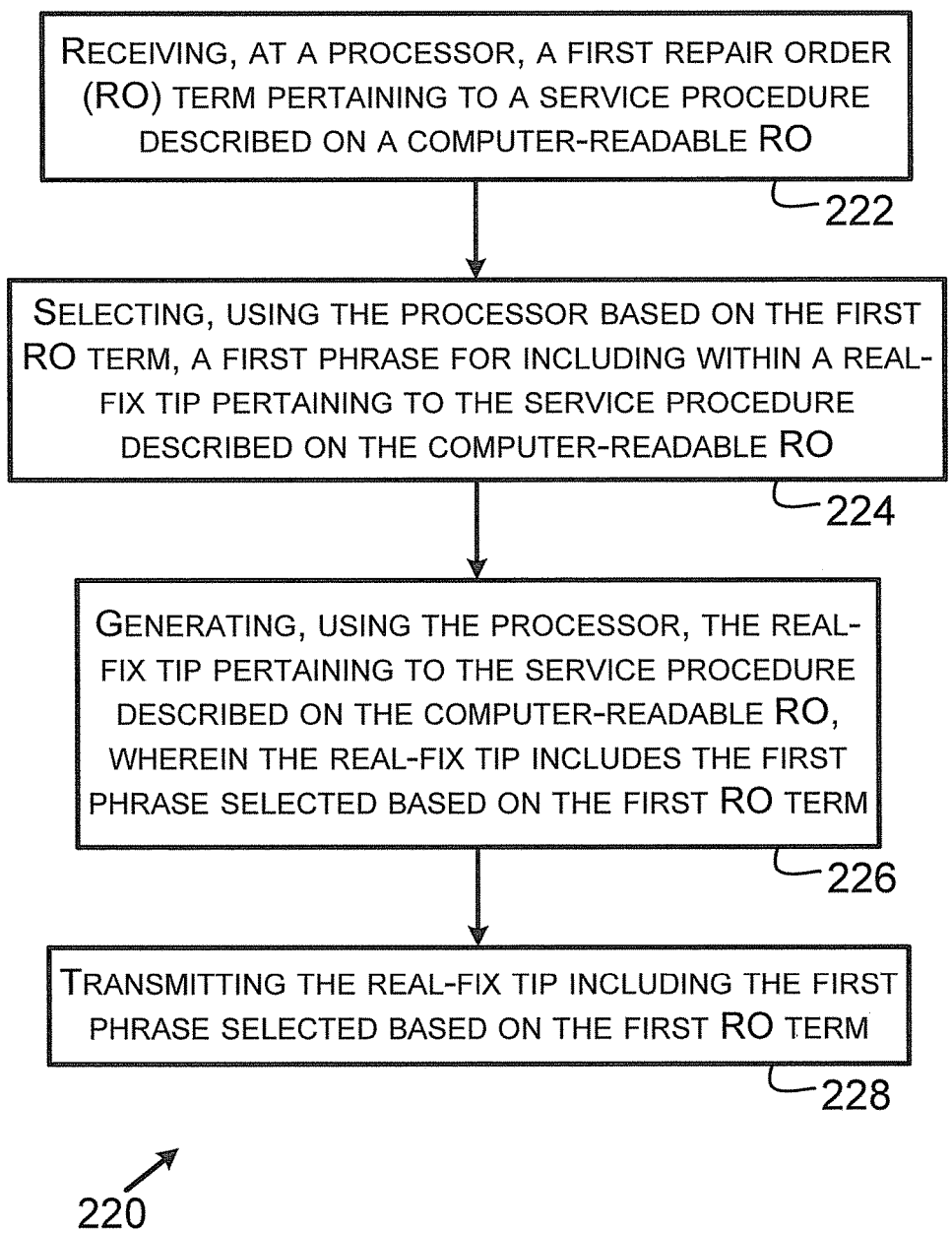
FIG. 22 is another flowchart depicting functions that can be carried out in accordance with one or more example embodiments.

FIG. 22 is a flowchart depicting a set of functions 220 (or more simply "the set 220") that can be carried out in accordance with one or more example embodiments described herein. The set 220 includes the functions shown in blocks labeled with even numbers 222 through 228, inclusive. In accordance with one or more of the example embodiments, a processor of RO collector DPM 104 can execute CRPI to perform the set 220. In accordance with one or more other example embodiments, another DPM in combination with RO collector DPM 104 can execute CRPI to perform the set of functions 220. Other examples of one or more DPM that can execute CRPI to perform the set 220 are also possible.

Block 222 includes receiving, at a processor, a first repair order (RO) term pertaining to a service procedure described on a computer-readable RO. The processor that receives the first RO term can be a processor within a DPM that generates real-fix tips. For example, the processor that receives the first RO can be processor 202 within DPM 200. Accordingly, the processor that receives the first RO can, e.g., be within RO collector DPM 104, fix-generator DPM 108, coordinator DPM 110 or RO distributor DPM 112.

The first RO term can comprise one or more RO terms pertaining to the service procedure described on the RO. Moreover, the first RO term can comprise a standard term or a non-standard term. A standard term of the first RO term can be defined within standard terms 1906. A non-standard term of the first RO term can be associated with a standard term defined within standard terms 1906 and can be used to select the standard term associated with the non-standard term.

As an example, receiving the first RO term can comprise processor 202 receiving the RO term "DTC P0101," a standard term identified in Table 2. As another example, receiving the first RO term can comprise processor 202 receiving a non-standard RO term, such as "Code 101," "Code 0101," "DTC 101," "DTC P101," or "P0101," and processor 202 executing CRPI 212 to select and receive from standard terms 1906 a standard term such as "DTC P0101." For purposes of this description, the standard term received at processor 202 can be referred to as a first RO term and the non-standard term received at processor 202 can be referred to as a second RO term, although the standard and non-standard terms are no so limited.

Receiving the first RO term can comprise receiving sufficient RO terms so that processor 202 can select a phrase pertaining to the service procedure RO. As an example, receiving the first RO term can comprise receiving the RO terms "DTC P0101" and "MAF Sensor" so that processor 202 can select a phrase for inserting a title, complaint, cause, or correction field from table 2300.

Block 224 includes selecting, using processor 202 based on the first RO term, a first phrase for including within a real-fix tip pertaining to the service procedure described on the computer-readable RO. Processor 202 can execute phrase selection CRPI 322 to select the first phrase (e.g., one or more phrases).

Continuing with the example in which the received RO terms include "DTC P0101" and "MAF Sensor," processor 202 can be arranged to select (i) the phrase of row 1 or row 2 for inserting into a title field of a real-fix tip, (ii) the phrase of row 4 for inserting into a complaint field of the real-fix tip, (iii) the phrase of row 5 for inserting into a cause field of the real-fix tip, and (iv) the phrase of row 6 for inserting into a correction field of the real-fix tip, as those selected phrases are associated with the RO terms "DTC P0101" and "MAF Sensor."

Block 226 includes generating, using processor 202, the real-fix tip pertaining to the service procedure described on the computer-readable RO, wherein the real-fix tip includes the first phrase selected based on the first RO term. Processor 202 can execute tip-generation CRPI 308 to generate the real-fix tip. Generating the real-fix tip can include selecting a phrase from phrase data 1916 for each field of the real-fix tip. Alternatively, generating the real-fix tip can include generating only a portion of the real-fix tip by selecting a phrase from phrase data 1916 for one or more, but not all, fields of the real-fix tip. Fix-generator DPM 108 or coordinator DPM 110 can be used to populate any fields of the real-fix tip that are not populated with a phrase from phrase data 1916.

In accordance with one or more example embodiments in which an incomplete phrase of phrase data 1916 is selected for populating a field of the real-fix tip, generating the real-fix tip can include completing the incomplete phrase. For example, if the phrase of table 2300, row 1, is selected, the RO term in column A, row 1 (i.e., DTC P0101), can be inserted into the incomplete phrase to identify a DTC between % DTC % in the incomplete phrase, and the RO term in column B, row 1 (i.e., MAF Sensor), can be inserted into the incomplete phrase to identify a component name between % component name % in the incomplete phrase.

Block 228 includes transmitting the real-fix tip including the first phrase selected based on the first RO term. Processor 202 can execute CRPI 212 to cause communications interface 204 to transmit the real-fix tip. As an example, transmitting the real-fix tip can include transmitting the real-fix tip from a DPM that generates the real-fix tip to RO database 106 for storing within real-fix tips 1912. As another example, transmitting the real-fix tip can include transmitting the real-fix tip from RO database 106 to RO distributor DPM 112 or from RO distributor DPM 112 to RO receiver 114. As yet another example, transmitting the real-fix tip can include transmitting the real-fix tip from RO database 106 to fix-generator DPM 108 or coordinator DPM 110.

Various events can trigger transmitting the real-fix tip. As an example, the triggering event can be generating the real-fix tip at block 226. As another example, the triggering event can be a processor receiving a selection of the real-fix tip or receiving a selection of the RO for which the real-fix tip was generated. Those selections can come from any of a variety of devices, such as RO receiver 114, RO distributor DPM 112, fix-generator DPM 108 or coordinator DPM. A device that receives the real-fix tip, such as RO receiver 114, can display the real-fix tip transmitted to that device.

VI. Conclusion

Example embodiments have been described above. Those skilled in the art will understand that changes and modifications can be made to the described embodiments without departing from the true scope and spirit of the present invention, which is defined by the claims.

I claim:

1. A method comprising:
   storing, at a database, a first repair order (RO) and phrase data separate from the first RO, wherein the phrase data comprises multiple multi-word phrases and for each phrase: at least one matchable RO term and a real-fix tip field identifier that associates the phrase with a real-fix tip field from among a set of real-fix tip fields, wherein the set of real-fix tip fields comprises a complaint field, a cause field, and a correction field, and wherein the first RO contains a vehicle identifier of a first individual vehicle;
   determining, by at least one processor, multiple RO terms based on RO terms contained in the first RO, wherein the multiple RO terms pertain to a service procedure already performed to the first individual vehicle;
   determining, by the at least one processor from the phrase data, a first multi-word phrase, wherein the first multi-word phrase is associated with a first real-fix tip field identifier, wherein the at least one matchable RO term associated with the first multi-word phase matches at least one of the received multiple RO terms, wherein the first multi-word phrase includes at least a first word that differs from both the at least one matchable RO term associated with the first multi-word phrase and the received multiple RO terms, and wherein the first real-fix tip field identifier identifies the complaint field, the cause field, or the correction field;
   generating, by the at least one processor, a real-fix tip by populating a first field of the real-fix tip with the first multi-word phrase determined from the phrase data separate from the first RO, wherein the first multi-word phrase is indicative of a complaint listed on the first RO if the first real-fix tip field identifier identifies the complaint field, a cause listed on the first RO if the first real-fix tip field identifier identifies the cause field, or a correction listed on the first RO if the first real-fix tip field identifier identifies the correction field; and
   transmitting the real-fix tip.

2. The method of claim 1, wherein transmitting the real-fix tip includes at least one of transmitting the real-fix tip to a non-transitory computer-readable storage medium and transmitting the real-fix tip to a data processing machine with a display configured to display the real-fix tip.

3. The method of claim 1, further comprising:

linking, by the at least one processor, the real-fix tip to a group of RO, wherein the group of RO includes the first RO and at least one other RO identified during a search of a non-transitory computer-readable storage medium in which the first RO was discovered.

4. The method of claim 3, further comprising:

providing, by the at least one processor for displaying on a display, a number indicating a quantity of repair orders within the group of RO.

5. The method of claim 1, wherein the multiple RO terms comprise one or more of a diagnostic trouble code (DTC), a vehicle component name, and a customer complaint.

6. The method of claim 5, wherein the first multi-word phrase comprises the one or more of the DTC, the vehicle component name, and the customer complaint.

7. The method of claim 5, wherein generating the real-fix tip includes adding the one or more of the DTC, the vehicle component name, and the customer complaint to the first multi-word phrase.

8. The method of claim 1, further comprising:

storing, within a non-transitory computer-readable storage medium, computer-readable program instructions executable by the at least one processor to determine the first multi-word phrase and to generate the real-fix tip, wherein determining the first multi-word phrase comprises the at least one processor executing the computer-readable program instructions to determine the first multi-word phrase, wherein generating the real-fix tip comprises the at least one processor executing the computer-readable program instructions to generate the real-fix tip, and wherein determining the first multi-word phrase and generating the real-fix tip occurs before the first RO is selected for displaying on a display at a data processing machine.

9. The method of claim 1, further comprising:

storing, within a non-transitory computer-readable storage medium, computer-readable program instructions executable by the at least one processor to determine the first multi-word phrase and to generate the real-fix tip, wherein determining the first multi-word phrase comprises the at least one processor executing the computer-readable program instructions to determine the first multi-word phrase, wherein generating the real-fix tip comprises the at least one processor executing the computer-readable program instructions to generate the real-fix tip, and wherein selecting the first multi-word phrase and generating the real-fix tip occurs after the first RO is selected for displaying on a display at a data processing machine.

10. The method of claim 1, wherein the vehicle identifier includes at least one of a vehicle identification number, a vehicle year identifier, a vehicle make identifier, a vehicle model identifier, a vehicle engine identifier, and a vehicle system identifier.

11. The method of claim 1, further comprising:

generating, by the at least one processor, a graphical user interface (GUI);

displaying, by a display connected to the at least one processor, the GUI, wherein the displayed GUI includes a selection interface for selecting at least one of a diagnostic trouble code number, a component name, and a symptom identifier.

12. The method of claim 1, further comprising:

storing, at the database, one or more other repair orders and one or more other real-fix tips generated by the at least one processor selecting one or more phrases from the phrase data.

13. The method of claim 1, wherein at least one of the multiple RO terms comprises a standard RO term mapped to a non-standard term contained in the the first RO.

14. The method of claim 1, wherein at least one of the multiple RO terms is identical to one of the RO terms contained in the first RO.

15. The method of claim 1, further comprising:

determining, by the at least one processor from the phrase data, a second multi-word phrase, wherein the second multi-word phrase is associated with a second real-fix tip field identifier different than the first real-fix tip field identifier, wherein the at least one matchable RO term associated with the second multi-word phase matches at least one of the received multiple RO terms, wherein the second multi-word phrase includes at least one word that differs from both the at least one matchable RO term associated with the second multi-word phrase and the received multiple RO terms, and wherein the second real-fix tip field identifier identifies a first of the complaint field, the cause field, and the correction field not identified by the first real-fix tip field identifier, wherein generating the real-fix tip comprises populating a second field of the real-fix tip with the second multi-word phrase determined from the phrase data separate from the first RO, wherein the second multi-word phrase is indicative of a complaint listed on the first RO if the second real-fix tip field identifier identifies the complaint field, a cause listed on the first RO if the second real-fix tip field identifier identifies the cause field, or a correction listed on the first RO if the second real-fix tip field identifier identifies the correction field.

16. The method of claim 15, further comprising:

determining, by the at least one processor from the phrase data, a third multi-word phrase, wherein the third multi-word phrase is associated with a third real-fix tip field identifier different than both the first real-fix tip field identifier and the second real-fix tip identifier, wherein the at least one matchable RO term associated with the third multi-word phase matches at least one of the received multiple RO terms, wherein the third multi-word phrase includes at least one word that differs from both the at least one matchable RO term associated with the third multi-word phrase and the received multiple RO terms, and wherein the third real-fix tip field identifier identifies a second of the complaint field, the cause field, and the correction field not identified by the first real-fix tip field identifier, wherein generating the real-fix tip comprises populating a third field of the real-fix tip with the third multi-word phrase determined from the phrase data separate from the first RO, wherein the third multi-word phrase is indicative of a complaint listed on the first RO if the third real-fix tip field identifier identifies the complaint field, a cause listed on the first RO if the third real-fix tip field identifier identifies the cause field, or a correction listed on the first RO if the third real-fix tip field identifier identifies the correction field.

* * * * *